US011134447B2

(12) United States Patent
Dou et al.

(10) Patent No.: US 11,134,447 B2
(45) Date of Patent: Sep. 28, 2021

(54) POWER CONTROL METHOD FOR TRANSMITTING UPLINK CHANNEL

(71) Applicant: HUAWEI TECHNOLOGIES CO., LTD., Guangdong (CN)

(72) Inventors: Shengyue Dou, Shanghai (CN); Ting Wang, Shanghai (CN); Haibao Ren, Shanghai (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1 day.

(21) Appl. No.: 16/579,568

(22) Filed: Sep. 23, 2019

(65) Prior Publication Data
US 2020/0022087 A1  Jan. 16, 2020

Related U.S. Application Data

(63) Continuation of application No. PCT/CN2018/078080, filed on Mar. 6, 2018.

(30) Foreign Application Priority Data

Mar. 24, 2017 (CN) .......................... 201710183222.5
Jun. 15, 2017 (CN) .......................... 201710451379.1
Aug. 11, 2017 (CN) .......................... 201710687604.1

(51) Int. Cl.
*H04W 4/00* (2018.01)
*H04W 52/14* (2009.01)
(Continued)

(52) U.S. Cl.
CPC ....... *H04W 52/146* (2013.01); *H04W 52/367* (2013.01); *H04W 52/54* (2013.01); *H04W 72/042* (2013.01); *H04W 80/08* (2013.01)

(58) Field of Classification Search
CPC . H04W 52/146; H04W 52/367; H04W 52/54; H04W 72/042; H04W 8/08
See application file for complete search history.

(56) References Cited

U.S. PATENT DOCUMENTS 10,798,684 B2* 10/2020 Marinier ............. H04W 52/146
2011/0081939 A1  4/2011 Damnjanovic et al.
(Continued)

FOREIGN PATENT DOCUMENTS

CN  101754338 A  6/2010
CN  101820672 A  9/2010
(Continued)

OTHER PUBLICATIONS

3GPP TS 36.101 V14.2.1 (Jan. 2017);3rd Generation Partnership Project;Technical Specification Group Radio Access Network;Evolved Universal Terrestrial Radio Access (E-UTRA);User Equipment (UE) radio transmission and reception (Release 14);total 1200 pages.
(Continued)

*Primary Examiner* — Abdelnabi O Musa
(74) *Attorney, Agent, or Firm* — Womble Bond Dickinson (US) LLP

(57) ABSTRACT

This application provides a power control method, a terminal, and a network device. The power control method includes: receiving, by a terminal, at least one piece of downlink control information (DCI) sent by at least one network device, where the at least one piece of DCI includes at least two transmit power control commands; and determining, by the terminal, a transmit power on an uplink channel in a same carrier based on the at least two transmit power control commands. According to the power control method in the embodiments of this application, the terminal can determine the transmit power on the uplink channel based on a plurality of transmit power control commands,
(Continued)

thereby ensuring efficient and proper power allocation and improving overall system performance.

14 Claims, 9 Drawing Sheets

(51) Int. Cl.
*H04W 52/36* (2009.01)
*H04W 52/54* (2009.01)
*H04W 72/04* (2009.01)
*H04W 80/08* (2009.01)

(56) References Cited

U.S. PATENT DOCUMENTS

| | | | |
|---|---|---|---|
| 2011/0275403 A1* | 11/2011 | Chen | H04W 52/325 |
| | | | 455/522 |
| 2014/0119266 A1 | 5/2014 | Ng et al. | |
| 2014/0161078 A1 | 6/2014 | Zhang et al. | |
| 2015/0110023 A1 | 4/2015 | Pan et al. | |
| 2015/0223208 A1 | 8/2015 | Park et al. | |
| 2015/0223213 A1* | 8/2015 | Moon | H04W 52/40 |
| | | | 370/329 |
| 2016/0135193 A1 | 5/2016 | Zhang et al. | |
| 2016/0227486 A1 | 8/2016 | Park | |
| 2016/0286495 A1 | 9/2016 | Dinan | |
| 2018/0262993 A1* | 9/2018 | Akkarakaran | H04W 52/346 |
| 2019/0335399 A1 | 10/2019 | Wang et al. | |

FOREIGN PATENT DOCUMENTS

| | | |
|---|---|---|
| CN | 102349346 A | 2/2012 |
| CN | 102395184 A | 3/2012 |
| CN | 102415169 A | 4/2012 |
| CN | 102550090 A | 7/2012 |
| CN | 102695261 A | 9/2012 |
| CN | 102938930 A | 2/2013 |
| CN | 103096448 A | 5/2013 |
| CN | 103327594 A | 9/2013 |
| CN | 104301979 A | 1/2015 |
| CN | 104619000 A | 5/2015 |
| CN | 104704755 A | 6/2015 |
| CN | 104770039 A | 7/2015 |
| CN | 105451314 A | 3/2016 |
| CN | 108282202 A | 7/2018 |
| CN | 108632970 A | 10/2018 |
| EP | 2343934 A1 | 7/2011 |
| EP | 2375832 A2 | 10/2011 |
| EP | 2770785 B1 | 8/2014 |
| EP | 2945437 A1 | 11/2015 |
| WO | 2010107885 A2 | 9/2010 |
| WO | 2018164765 A1 | 9/2018 |

OTHER PUBLICATIONS

3GPP TS 36.211 V14.2.0 (Mar. 2017);3rd Generation Partnership Project;Technical Specification Group Radio Access Network;Evolved Universal Terrestrial Radio Access (E-UTRA);Physical channels and modulation(Release 14);total 197 pages.

3GPP TS 36.213 V14.2.0 (Mar. 2017);3rd Generation Partnership Project;Technical Specification Group Radio Access Network;Evolved Universal Terrestrial Radio Access (E-UTRA);Physical layer procedures(Release 14);total 454 pages.

MCC Support,"Final Report of 3GPP TSG RAN WG1 #AH1_NR v1.0.0",3GPP TSG RAN WG1 Meeting #88 R1-1701553,Athens, Greece, Feb. 13-17, 2017,total 106 pages.

* cited by examiner

POWER CONTROL METHOD FOR TRANSMITTING UPLINK CHANNEL

CROSS-REFERENCE TO RELATED APPLICATIONS

This application is a continuation of International Application No. PCT/CN2018/078080, filed on Mar. 6, 2018, which claims priority to Chinese Patent Application No. 201710183222.5, filed on Mar. 24, 2017, Chinese Patent Application No. 201710451379.1, filed on Jun. 15, 2017, and Chinese Patent Application No. 201710687604.1, filed on Aug. 11, 2017. The disclosures of the aforementioned applications are hereby incorporated by reference in their entireties.

TECHNICAL FIELD

This application relates to the communications field, and more particularly, to a power control method, a terminal, and a network device.

BACKGROUND

In a new radio access technology (NR) system, coordinated multipoint (CoMP) transmission has been widely researched as a key technology that can be used to improve performance of a terminal in an edge cell. In a CoMP scenario, data may be separately sent or uplink control information (UCI) may be separately reported to a base station of a serving cell and a base station of a cooperating cell by using an uplink channel. For example, the UCI may be information such as channel state information (CSI), an acknowledgement (ACK), and a negative acknowledgement (NACK).

For example, in an NR system, a manner of reporting CSI by using an air interface may be considered to avoid a delay of exchanging the CSI between a serving cell and a cooperating cell in a non-ideal backhaul link. In one embodiment, a terminal measures CSI 1 between the terminal and a base station of the serving cell and CSI 2 between the terminal and a base station of the cooperating cell, and separately feeds back the CSI 1 and the CSI 2 to the base station of the serving cell and the base station of the cooperating cell by using a physical uplink control channel (PUCCH) or a physical uplink shared channel (PUSCH). The terminal may report one PUCCH or one PUSCH at a transmit power. The PUCCH or the PUSCH includes both the CSI 1 between the terminal and the base station of the serving cell and the CSI 2 between the terminal and the base station of the cooperating cell. Alternatively, the terminal may report one PUCCH or one PUSCH to each base station at a transmit power.

It can be learned that the terminal needs to control an uplink power regardless of a manner in which the terminal performs reporting. When the terminal reports UCI or sends uplink data by using an uplink channel, how to control a transmit power on the uplink channel becomes an urgent problem to be resolved.

SUMMARY

This application provides a power control method, a terminal, and a network device, to determine a transmit power on an uplink channel based on a plurality of transmit power control commands, thereby ensuring efficient and proper power allocation and improving overall system performance.

According to a first aspect, a power control method is provided, and includes: receiving, by a terminal, at least one piece of downlink control information (DCI) sent by at least one network device, where the at least one piece of DCI includes at least two transmit power control commands; and determining, by the terminal, a transmit power on an uplink channel in a same carrier based on the at least two transmit power control commands.

In one embodiment, the uplink channel may be a PUCCH and/or a PUSCH.

In one embodiment, the transmit power control command may be a transmission power control (TPC) command.

According to the power control method in this embodiment of this application, the terminal can determine the transmit power on the uplink channel based on a plurality of transmit power control commands, thereby ensuring efficient and proper power allocation and improving overall system performance.

In one embodiment, the receiving, by a terminal, at least one piece of DCI sent by at least one network device includes: receiving, by the terminal, DCI sent by a first network device, where the DCI sent by the first network device includes the at least two transmit power control commands of the terminal, and the first network device is any one of the at least one network device.

The transmit power control command may be a TPC command. Therefore, in this embodiment of this application, an existing TPC command for the terminal may be extended to a plurality of TPC commands for the terminal, to meet an actual requirement of a system.

In one embodiment, the at least two transmit power control commands occupy n bits, n is a positive integer greater than 2, and a correspondence between the n bits and the at least two transmit power control commands is configured by using higher layer signaling or predefined.

In one embodiment, the higher layer signaling may be radio resource control (RRC) signaling or media access control element (MAC CE).

In one embodiment, the determining, by the terminal, a transmit power on an uplink channel in a same carrier based on the at least two transmit power control commands includes: determining, by the terminal, the transmit power on the uplink channel based on an adjustment step or an absolute power adjustment value indicated by each transmit power control command.

In one embodiment, the determining, by the terminal, a transmit power on an uplink channel in a same carrier based on the at least two transmit power control commands includes: determining, by the terminal, a target transmit power control command in the at least two transmit power control commands; and determining, by the terminal, the transmit power on the uplink channel in the same carrier based on the target transmit power control command.

In one embodiment, the determining, by the terminal, a target transmit power control command in the at least two transmit power control commands includes: determining, by the terminal, the target transmit power control command based on at least one of a resource location of the at least one piece of DCI, an aggregation level of the at least one piece of DCI, a scrambling manner of the at least one piece of DCI, and first indication information included in the at least one piece of DCI.

In one embodiment, the terminal determines, as the target transmit power control command, a transmit power control command included in DCI that is in the at least one piece of DCI and that meets at least one of the following conditions:

The DCI is carried at a target resource location, an aggregation level of the DCI is a target aggregation level, a scrambling manner of the DCI is a target scrambling manner, and first indication information included in the DCI is target first indication information.

In one embodiment, the determining, by the terminal, a target transmit power control command in the at least two transmit power control commands includes: determining, by the terminal, candidate DCI in the at least one piece of DCI, where the candidate DCI is determined through predefining or through interaction between network devices.

The terminal determines a transmit power control command included in the candidate DCI as the target transmit power control command.

In one embodiment, the determining, by the terminal, candidate DCI in the at least one piece of DCI includes: determining, by the terminal, the candidate DCI based on at least one of: resource location of the at least one piece of DCI, aggregation level of at least one piece of DCI, scrambling manner of the at least one piece of DCI, and first indication information included in the at least one piece of DCI.

In one embodiment, the determining, by the terminal, candidate DCI in the at least one piece of DCI includes: determining, by the terminal as the candidate DCI, DCI that meets at least one of the following conditions: The DCI is carried at a target resource location, an aggregation level of the DCI is a target aggregation level, a scrambling manner of the DCI is a target scrambling manner, and first indication information included in the DCI is target first indication information.

In one embodiment, the candidate DCI is sent by a serving network device of the terminal.

In one embodiment, the resource location is any one of the following:

search space, a candidate control channel set, and a control resource set.

In one embodiment, the determining, by the terminal, a transmit power on an uplink channel in a same carrier based on the at least two transmit power control commands includes: separately determining, by the terminal, at least two candidate transmit powers based on the at least two transmit power control commands, where the at least two candidate transmit powers are in a one-to-one correspondence with the at least two transmit power control commands; and determining, by the terminal, the transmit power on the uplink channel based on the at least two candidate transmit powers.

In one embodiment, the determining, by the terminal, the transmit power on the uplink channel in the same carrier based on the at least two candidate transmit powers includes: determining, by the terminal as the transmit power on the uplink channel, a maximum transmit power or a minimum transmit power in the at least two candidate transmit powers, or an average value of the at least two candidate transmit powers.

The terminal determines the maximum transmit power in the at least two candidate transmit powers as the transmit power on the uplink channel, to ensure transmission stability of the uplink channel. The terminal determines the minimum transmit power in the at least two candidate transmit powers as the transmit power on the uplink channel, to reduce interference to another terminal in a local cell.

In one embodiment, the determining, by the terminal, the transmit power on the uplink channel in the same carrier based on the at least two candidate transmit powers includes: determining, by the terminal, a weighted sum of the at least two candidate transmit powers as the transmit power on the uplink channel.

In one embodiment, a weighted value of each candidate transmit power may be calculated by the terminal, may be configured by the network device, or may be predefined. This is not limited in this embodiment of this application.

In one embodiment, the determining, by the terminal, a transmit power on an uplink channel in a same carrier based on the at least two transmit power control commands includes: determining, by the terminal, the transmit power on the uplink channel based on a first transmit power control command in the at least two transmit power control commands.

According to a second aspect, a power control method is provided, and includes: receiving, by a terminal, DCI sent by a first network device, where the DCI includes at least two transmit power control commands of the terminal; and determining, by the terminal, a transmit power on an uplink channel of each of at least two network devices based on the at least two transmit power control commands, where the at least two network devices are in a one-to-one correspondence with the at least two transmit power control commands, and the at least two network devices include the first network device.

According to the power control method in this embodiment of this application, the terminal can determine the transmit power on the uplink channel based on a plurality of transmit power control commands, thereby ensuring efficient and proper power allocation and improving overall system performance.

In one embodiment, the at least two transmit power control commands occupy n bits, n is a positive integer greater than 2, and a correspondence between the n bits and the at least two transmit power control commands is configured by using higher layer signaling or predefined.

In one embodiment, the determining, by the terminal, a transmit power on an uplink channel of each of at least two network devices based on the at least two transmit power control commands includes: determining, by the terminal, the transmit power on the uplink channel of each network device based on an adjustment step or an absolute power adjustment value indicated by each transmit power control command.

In one embodiment, the determining, by the terminal, the transmit power on the uplink channel of each network device based on an adjustment step or an absolute power adjustment value indicated by each transmit power control command includes: determining, by the terminal, the transmit power on the uplink channel of each network device based on the adjustment step indicated by each transmit power control command and a propagation loss corresponding to the uplink channel of each network device or based on the absolute power adjustment value indicated by each transmit power control command and a propagation loss corresponding to the uplink channel of each network device.

In one embodiment, the propagation loss corresponding to the uplink channel of each network device is indicated by using indication information in the DCI or higher layer signaling.

In one embodiment, the determining, by the terminal, a transmit power on an uplink channel of each of at least two network devices based on the at least two transmit power control commands includes:

determining, by the terminal, an $i^{th}$ candidate transmit power $P_{1i}$ in at least two candidate transmit powers based on an $i^{th}$ transmit power control command in the at least two transmit power control commands, where the at least two transmit power control commands are in a one-to-one correspondence with the at least two candidate transmit powers; a value of i is obtained through traversing in a range of 1 to N, and i is a positive integer; N is a quantity of the at least two uplink channels, and N is a positive integer greater than 1; and $P_{1i}>0$; and when $P_{11}+P_{12}+\ldots+P_{1N} \leq P_0$, determining, by the terminal, that a transmit power on an uplink channel of an $i^{th}$ network device in the at least two network devices is $P_{1i}$; or when $P_{11}+P_{12}+\ldots+P_{1N} > P_0$, determining, by the terminal, a transmit power $P_{2i}$ on an $i^{th}$ uplink channel according to any one of the following formulas:

$$a_0*(P_{11}+P_{12}+\ldots+P_{1N}) \leq P_0, \text{ and } P_{2i}=a_0*P_{1i}; \text{ or}$$

$$a_1*P_{11}+a_2*P_{12}+\ldots+a_N*P_{1N} \leq P_0, \text{ and } P_{2i}=a_i*P_{1i},$$
where $P_{2i}>0$, $P_0$ is a maximum transmit power of the terminal, $a_0$ and $a_i$ are scaling factors, $0<a_0<1$, and $a_i \geq 0$.

According to the method in this embodiment of this application, the terminal can ensure, based on a plurality of received transmit power control commands in a power scaling manner, that a power for uplink transmission is less than the maximum transmit power of the terminal.

In one embodiment, the scaling factor $a_i$ is determined based on a priority of the uplink channel of the $i^{th}$ network device.

According to a third aspect, a power control method is provided, and includes: sending, by a network device, DCI to a terminal, where the DCI includes at least two transmit power control commands of the terminal, and the at least two transmit power control commands are used by the terminal to determine a transmit power on at least one uplink channel; and receiving, by the network device, a first uplink channel that is in the at least one uplink channel and that is sent by the terminal.

In one embodiment, the at least two transmit power control commands occupy n bits, n is a positive integer greater than 2, and a correspondence between the n bits and the at least two transmit power control commands is configured by using higher layer signaling or predefined.

In one embodiment, the DCI further includes indication information, and the indication information is used to indicate a propagation loss corresponding to each of the at least one uplink channel.

According to a fourth aspect, a terminal is provided, and is configured to perform the method according to any one of the first aspect or any of the embodiments. In one embodiment, the terminal includes a unit configured to perform the method according to any one of the first aspect or any of the embodiments.

According to a fifth aspect, a terminal is provided, and is configured to perform the method according to any one of the second aspect or any of the embodiments. In one embodiment, the terminal includes a unit configured to perform the method according to any one of the second aspect or any of the embodiments.

According to a sixth aspect, a network device is provided, and is configured to perform the method according to any one of the third aspect or any of the embodiments. In one embodiment, the network device includes a unit configured to perform the method according to any one of the third aspect or any of the embodiments.

According to a seventh aspect, a terminal is provided, and the terminal includes a memory and a processor. The memory is configured to store a computer program, and the processor is configured to: invoke the computer program from the memory and run the computer program, so that the terminal performs the method according to any one of the first aspect or any of the embodiments.

According to an eighth aspect, a terminal is provided, and the terminal includes a memory and a processor. The memory is configured to store a computer program, and the processor is configured to: invoke the computer program from the memory and run the computer program, so that the terminal performs the method according to any one of the second aspect or any of the embodiments.

According to a ninth aspect, a network device is provided, and the network device includes a memory and a processor. The memory is configured to store a computer program, and the processor is configured to: invoke the computer program from the memory and run the computer program, so that the network device performs the method according to any one of the third aspect or any of the embodiments.

According to a tenth aspect, a computer readable storage medium is provided, and is configured to store a computer program. The computer program includes an instruction used to perform the method according to any one of the foregoing aspects or any of the embodiments.

According to an eleventh aspect, a computer program product including an instruction is provided. When running on a computer, the computer program product enables the computer to perform the method according to any one of the foregoing aspects or any of the embodiments.

According to a twelfth aspect, a power control method is provided, and includes: determining, by a terminal, a first propagation loss on a first uplink channel, where the first propagation loss is obtained by measuring a first downlink reference signal in a plurality of downlink reference signals; and determining, by the terminal, a transmit power on the first uplink channel based on the first propagation loss.

In one embodiment, the plurality of downlink reference signals correspond to a plurality of network devices.

According to the power control method provided in this application, the terminal may determine a transmit power on a first PUCCH with reference to the first propagation loss. A propagation loss between a network device and the terminal is fully considered. Therefore, according to the power control method in this embodiment of this application, a probability that the network device correctly receives an uplink channel can be improved, to improve system performance.

In one embodiment, the determining, by a terminal, a first propagation loss on a first uplink channel includes: receiving, by the terminal, physical layer signaling and/or higher layer signaling sent by a network device, where the physical layer signaling and/or the higher layer signaling include/includes quasi co-location (QCL) indication information, and the QCL indication information is used to indicate a QCL relationship between antenna ports on which the plurality of downlink reference signals are sent; and determining, by the terminal, the first downlink reference signal based on the QCL relationship to determine the first propagation loss; or determining, by the terminal based on the QCL relationship, the first propagation loss corresponding to the first downlink reference signal.

In one embodiment, the determining, by a terminal, a first propagation loss on a first uplink channel includes: receiving, by the terminal, physical layer signaling and/or higher layer signaling sent by a network device, where the physical layer signaling and/or the higher layer signaling include/includes first indication information, and the first indication information is used to indicate information about a downlink reference signal corresponding to the first uplink channel; and determining, by the terminal, the first downlink reference signal based on the first indication information to determine the first propagation loss.

In one embodiment, the information about the downlink reference signal may be information such as a resource index of the first downlink reference signal, information about an antenna port on which the first downlink reference signal is sent, and a pattern of the first downlink reference signal.

In one embodiment, the downlink reference signal includes at least one of the following: a secondary synchronization signal (SSS), a primary synchronization signal (PSS), a channel state information-reference signal (CSI-RS), and a demodulation reference signal (DMRS).

In one embodiment, the PSS and/or the SSS may be sent by using an SS block, in other words, the PSS, the SSS, and a physical broadcast channel (PBCH) are simultaneously sent; or the PSS and/or the SSS may be sent without using an SS block, in other words, the PSS and/or the SSS may be separately sent.

According to a thirteenth aspect, a power control method is provided, and includes: sending, by a first network device, a first downlink reference signal to a terminal, where the first downlink reference signal is used by the terminal to determine a first propagation loss; and receiving, by the first network device, a first uplink channel sent by the terminal, where a transmit power on the first uplink channel is determined by the terminal based on the first propagation loss.

In one embodiment, the plurality of downlink reference signals correspond to a plurality of network devices.

According to the power control method provided in this application, the terminal may determine a transmit power on a first PUCCH with reference to the first propagation loss. A propagation loss from a network device to the terminal is fully considered. Therefore, according to the power control method in this embodiment of this application, a probability that the network device correctly receives an uplink channel can be improved, to improve system performance.

In one embodiment, the first downlink reference signal or the first propagation loss corresponding to the first downlink reference signal is determined by the terminal based on quasi co-location (QCL) indication information, the QCL indication information is sent by the network device by using physical layer signaling and/or higher layer signaling, the QCL indication information is used to indicate a QCL relationship between antenna ports on which the plurality of downlink reference signals are sent, and the plurality of downlink reference signals include the first downlink reference signal.

In one embodiment, the first downlink reference signal is determined by the terminal based on first indication information, the first indication information is sent by the network device by using physical layer signaling and/or higher layer signaling, the first indication information is used to indicate information about a downlink reference signal corresponding to the first uplink channel, and the information about the downlink reference signal is used to indicate the first downlink reference signal.

In one embodiment, the information about the downlink reference signal may be information such as a resource index of the first downlink reference signal, information about an antenna port on which the first downlink reference signal is sent, and a pattern of the first downlink reference signal.

In one embodiment, the downlink reference signal includes at least one of the following: a secondary synchronization signal (SSS), a primary synchronization signal (PSS), a channel state information-reference signal (CSI-RS), and a demodulation reference signal (DMRS).

According to a fourteenth aspect, a terminal is provided, and is configured to perform the method according to any one of the twelfth aspect or any of the embodiments. In one embodiment, the terminal includes a unit configured to perform the method according to any one of the twelfth aspect or any of the embodiments.

According to a fifteenth aspect, a network device is provided, and is configured to perform the method according to any one of the thirteenth aspect or any of the embodiments. In one embodiment, the network device includes a unit configured to perform the method according to any one of the thirteenth aspect or any of the embodiments.

According to a sixteenth aspect, an apparatus is provided, and the apparatus includes a memory and a processor. The memory is configured to store a computer program, and the processor is configured to: invoke the computer program from the memory and run the computer program, so that the apparatus performs the method according to any one of the twelfth aspect or any of the embodiments.

According to a seventeenth aspect, an apparatus is provided, and the apparatus includes a memory and a processor. The memory is configured to store a computer program, and the processor is configured to: invoke the computer program from the memory and run the computer program, so that the apparatus performs the method according to any one of the thirteenth aspect or any of the embodiments.

According to an eighteenth aspect, a computer readable storage medium is provided, and is configured to store a computer program. The computer program includes an instruction used to perform the method according to any one of the twelfth aspect or the possible implementations of the twelfth aspect and/or any one of the thirteenth aspect or the possible implementations of the thirteenth aspect.

According to a nineteenth aspect, a computer program product including an instruction is provided. When running on a computer, the computer program product enables the computer to perform the method according to any one of the twelfth aspect or the possible implementations of the twelfth aspect and/or any one of the thirteenth aspect or the possible implementations of the thirteenth aspect.

DESCRIPTION OF EMBODIMENTS

The following describes technical solutions in this application with reference to the accompanying drawings.

It should be understood that the technical solutions in this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, a long term evolution-advanced (LTE-A) system, a universal mobile telecommunications system (UMTS), or a 5G system (often referred to as an NR system).

Figure 1:
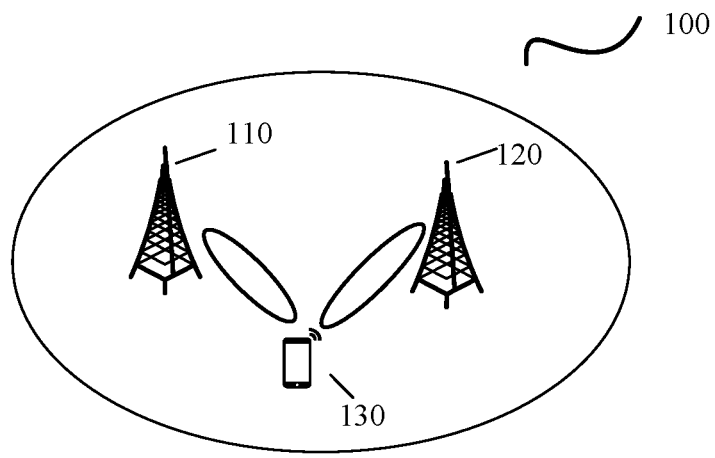
FIG. 1 is a schematic diagram of a system architecture of a power control method in this application.

FIG. 1 shows a wireless communications system 100 applicable to an embodiment of this application. The wireless communications system 100 may include a plurality of network devices, for example, a first network device 110 and a second network device 120 shown in FIG. 1. Both the first network device 110 and the second network device 120 may communicate with a terminal 130 by using a radio air interface. The first network device 110 and the second network device 120 may provide communication coverage for a geographic area, and may communicate with a terminal located in the coverage area. The first network device 110 or the second network device 120 may be a base transceiver station (BTS) in a GSM system or a CDMA system, or may be a NodeB in a WCDMA system, or may be an evolved NodeB (eNB or eNodeB) in an LTE system, or may be a transmission reception point (TRP), or the like. This is not limited in the embodiments of this application.

In addition, the network device in the embodiments of this application may be a network device that uses a CU-DU architecture. The network device that performs the method in the embodiments of this application may be a central control unit (CU), or may be a distributed unit (DU). The CU may also be referred to as a central node (central unit) or a control node (control unit).

The wireless communications system 100 further includes one or more terminals 130 located in coverage areas of the first network device 110 and the second network device 120. The terminal 130 may be mobile or fixed. The terminal 130 may communicate with one or more core networks (core network) by using a radio access network (RAN). The terminal may be referred to as a terminal device, an access terminal, user equipment (UE), a subscriber unit, a subscriber station, a mobile station, a mobile console, a remote station, a remote terminal, a mobile device, a user terminal, a wireless communications device, a user agent, or a user apparatus. The terminal may be a cellular phone, a cordless phone, a session initiation protocol (SIP) phone, a wireless local loop (WLL) station, personal digital assistant (PDA), a handheld device having a wireless communication function, a computing device, another processing device connected to a wireless modem, an in-vehicle device, a wearable device, or the like.

The wireless communications system 100 may support CoMP transmission. In one embodiment, a plurality of cells or a plurality of transmission points may cooperate to send data to a same terminal on a same carrier and in a same time period. The plurality of cells may belong to a same network device or different network devices, and may be selected based on a channel gain or a path loss, received signal strength, a received signal quality, and the like.

The terminal 130 in the wireless communications system 100 may support multipoint transmission. In other words, the terminal 130 may communicate with the first network device 110, or may communicate with the second network device 120. The first network device 110 may serve as a serving network device or a serving cell, and the second network device 120 may serve as a cooperating network device or a cooperating cell. Alternatively, the first network device 110 may serve as a cooperating network device or a cooperating cell, and the second network device 120 may serve as a serving network device or a serving cell. The serving network device is a network device that provides services such as an RRC connection, non-access stratum (NAS) mobility management, and security input for the terminal by using a radio air interface protocol.

For example, the first network device is the serving network device, and the second network device is the cooperating network device. There may be one or more second network devices. It may be understood that both the first network device and the second network device may be serving network devices.

The following explains some general concepts or definitions in the embodiments of this application.

(1) Search Space:

The search space may include a common search space and a UE-specific search space. The common search space is used to transmit common information at a cell level. For example, the common information at the cell level may include control information related to paging, a random access response (RAR), a broadcast control channel (BCCH), and the like. The UE-specific search space is used to transmit information at a terminal or UE level. For example, the information at the terminal or UE level may include control information related to a downlink shared channel (DL-SCH), an uplink shared channel (UL-SCH), and the like.

It should be understood that the common search space and the UE-specific search space are two types of search spaces defined in an LTE protocol. In this application, the UE-specific search space is used as an example for description, but should not be construed as any limitation on this application. A possibility of re-dividing or redefining the search space is not excluded in this application. Any resource used to transmit the information at the terminal level may be defined as the UE-specific search space in the embodiments of this application.

A search space is defined for a CCE aggregation level. One terminal device may have a plurality of search spaces, and CCEs in each search space may be contiguously distributed. The terminal device needs to listen to a group of PDCCHs. The group of PDCCHs which are listened to may be referred to as a "candidate control channel set" or "control channel candidates (PDCCH candidates)".

(2) Aggregation Level (AL):

The aggregation level represents a quantity of contiguous CCEs occupied by a PDCCH. One CCE is composed of nine resource element groups (REG). One REG is composed of four contiguous resource elements (RE) in frequency domain that include no reference signal (RS). In other words, one CCE is composed of 36 REs.

(3) Control Resource Set:

A control channel may be divided into a plurality of control resource sets, and each control resource set is a set of REGs. The terminal device may listen to a PDCCH on one or more control resource sets.

In one embodiment, for a network device, the control resource set may be understood as a resource occupied when the control channel is sent. For the terminal device, a search space of a PDCCH of each terminal device belongs to the control resource set. In other words, the network device may determine, from the control resource set, the resource used when the PDCCH is sent, and the terminal device may determine the search space of the PDCCH from the control resource set. The control resource set may include a time-frequency resource. For example, the time-frequency resource may be a segment of bandwidth, one or more subbands, or the like in frequency domain; may be a quantity of time units in time domain, for example, a quantity of symbols in a subframe, a slot, or a mini-slot; and may be contiguous or discontiguous resource units in time-frequency domain, for example, contiguous resource blocks (RB) or discontiguous RBs.

It should be understood that content of the foregoing enumerated frequency domain resource, time domain resource, and time-frequency domain resource is merely an example for description, but should not be construed as any limitation on the embodiments. For example, the RB may be defined as a resource defined in an existing LTE protocol, or may be defined as a resource defined in a future protocol, or may be replaced with another name. For another example, the time unit may be a subframe; or may be a slot; or may be a radio frame, a mini-slot (mini slot or sub slot), a plurality of aggregated slots, a plurality of aggregated subframes, a symbol, or the like; or may even be a transmission time interval (TTI). This is not limited in the embodiments of this application.

In the embodiments of this application, the terminal may simultaneously send UCI or data to a first network device and a second network device. The UCI or the data may be considered as common information of the first network device and the second network device. Alternatively, the terminal may send, to a first network device, UCI or data dedicated to the first network device, and send, to a second network device, UCI or data dedicated to the second network device.

It should be understood that the UCI or the data is carried on an uplink channel. In other words, the uplink channel may be used to carry the UCI or the data. In the embodiments of this application, whether the UCI or the data is carried on the uplink channel is not limited.

A serving cell c in the embodiments of this application may be understood as a carrier c. Transmission performed by the terminal in the serving cell c may be understood as transmission performed by the terminal on the carrier c. In addition, the serving cell may be a serving cell of an RRC connection, or may be a cooperating cell.

In one embodiment, the uplink channel may be a PUCCH and/or a PUSCH.

In one embodiment, higher layer signaling in the embodiments of this application may be RRC signaling, MAC CE signaling, or the like.

In one embodiment, the "carrier" in this application corresponds to a frequency band, for example, a frequency band whose center frequency is 800 MHz or a frequency band whose center frequency is 900 MHz.

In addition, sending of the uplink channel described in this application may be understood as sending of the UCI or the data. The UCI or the data is carried on the uplink channel.

In addition, a higher layer in this application may be a MAC layer, a radio link control (RLC) layer, a packet data convergence protocol (PDCP) layer, or the like other than a physical layer.

In one embodiment, a transmit power control command in this application may be a TPC command.

In one embodiment, the TPC command may be a relative-type command, or may be an absolute-type command. The relative-type command may be understood as follows: After the terminal receives the transmit power control command, an effect of adjusting a transmit power of the terminal is similar to that of relatively performing adjustment based on a current transmit power. The relative-type command may also be referred to as an accumulated-type command. The absolute-type command may be understood as follows: After the terminal receives the transmit power control command, an effect of adjusting a transmit power of the terminal is similar to that of performing adjustment based on an initial transmit power. A form of the transmit power control command may be related to a factor such as a network requirement or a transmission format. This is not limited in the embodiments of this application. For example, a form of configuring the transmit power control command may be indicated by using higher layer signaling.

A related existing technology is described before a power control method in the embodiments of this application is described in detail.

In the existing technology, if the terminal is located in a serving cell c, and the terminal transmits the uplink channel in a subframe i for the serving cell c, a transmit power on the uplink channel is calculated as follows (it should be understood that a result obtained through calculation according to the following formula is in a unit of dBm):

1. If the uplink channel is a PUSCH, the transmit power on the uplink channel is calculated as follows:

(1) If the PUSCH is transmitted in the subframe i but a PUCCH is not transmitted at the same time, the transmit power on the PUSCH is as follows:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

(2) If the PUSCH and a PUCCH are simultaneously transmitted in the subframe i, the transmit power on the PUSCH is as follows:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

(3) If the PUSCH is not transmitted in the subframe i, a received PUCCH-related transmit power control command in a DCI format 3/3A is accumulated. In this case, the transmit power on the PUSCH is as follows:

$$P_{PUSCH,c}(i) = \min \begin{Bmatrix} P_{CMAX,c}(i), \\ P_{O\_PUSCH,c}(1) + \alpha_c(1) \cdot PL_c + f_c(i) \end{Bmatrix}$$

Meanings of symbols and parameters are as follows:

(1) min represents acquisition of a minimum value, and log represents acquisition of a logarithm.

(2) $P_{CMAX,c}(i)$ is a configured maximum transmit power of the terminal in the subframe i for the serving cell c, and $\hat{P}_{CMAX,c}(i)$ is a linear value of $P_{CMAX,c}(i)$. If the terminal transmits the PUCCH without the PUSCH in the subframe i for the serving cell c, a received PUCCH-related TPC command in the DCI format 3/3A is accumulated. If the terminal transmits neither the PUCCH nor the PUSCH in the subframe i for the serving cell c, a received PUCCH-related TPC command in the DCI format 3/3A is accumulated, and $P_{CMAX,c}(i)$ is calculated by assuming that MPR=0 dB, A-MPR=0 dB, P-MPR=0 dB, and TC=0 dB. For a definition, refer to an existing standard, for example, the 3GPP technical specification group radio access network (Technical Specification Group Radio Access Network, TS-GRAN) 36.101.

(3) $\hat{P}_{PUCCH}(i)$ is a linear value of $P_{PUCCH}(i)$, and a definition of $P_{PUCCH}(i)$ is subsequently described.

(4) $M_{PUSCH,c}(i)$ is bandwidth of a PUSCH resource allocated in the subframe i for the serving cell c, and is represented by a quantity of valid resource blocks (RB).

(5) If the terminal is configured with a higher layer parameter UplinkPowerControlDedicated-v12x0 for the serving cell c, and if the subframe i belongs to an uplink power control subframe set 2 indicated by using a higher layer parameter tpc-SubframeSet-r12, (5.1) when j=0, $P_{O\_PUSCH,c}(0)=P_{O\_UE\_PUSCH,c,2}(0)+P_{O\_NOMINAL\_PUSCH,c,2}(0)$, where j=0 is used for PUSCH transmission/retransmission corresponding to a semi-persistent grant, and $P_{O\_UE\_PUSCH,2}(0)$ and $P_{O\_NOMINAL\_PUSCH,2}(0)$ are provided by using higher layer parameters p0-terminal-PUSCH-Persistent-SubframeSet2-r12 and p0-NominalPUSCH-Persistent-SubframeSet2-r12;

(5.2) when j=1, $P_{O\_PUSCH,c}(1)=P_{O\_UE\_PUSCH,c,2}(1)+P_{O\_NOMINAL\_PUSCH,c,2}(1)$, where j=1 is used for PUSCH transmission/retransmission corresponding to a dynamic scheduled grant, and $P_{O\_UE\_PUSCH,2}(1)$ and $P_{O\_NOMINAL\_PUSCH,2}(1)$ are provided by using higher layer parameters p0-terminal-PUSCH-SubframeSet2-r12 and p0-NominalPUSCH-SubframeSet2-r12; or (5.3) when j=2, $P_{O\_PUSCH,c}(2)=P_{O\_UE\_PUSCH,c}(2)+P_{O\_NOMINAL\_PUSCH,c}(2)$, where j=$_2$ is used for PUSCH transmission/retransmission corresponding to a random access response grant; $P_{O\_UE\_PUSCHc}(2)=0$ and $P_{O\_NOMINAL\_PUSCH,c}(2)=P_{O\_PRE}+\Delta_{PREAMBLE\_Msg3}$; and parameters preambleInitialReceivedTargetPower ($P_{O\_PRE}$) and $\Delta_{PREAMBLE\_Msg3}$ are defined at a higher layer.

Otherwise, (5.4) $P_{O\_PUSCH,c}(j)$ is a parameter composed of a sum of a parameter part $P_{O\_NOMINAL\_PUSCH,c}(j)$ provided at a higher layer when j=0 and j=1 and a parameter part $P_{O\_UE\_PUSCH,c}(j)$ when j=0 and j=1. For PUSCH transmission (retransmission) corresponding to a semi-persistent grant, j=0; for PUSCH transmission (retransmission) corresponding to a dynamic scheduled grant, j=1; and for PUSCH transmission (retransmission) corresponding to a random access response grant, j=2.$P_{O\_UE\_PUSCH,c}(2)=0$ and $P_{O\_NOMINAL\_PUSCH,c}(2)=P_{O\_PRE}+\Delta_{PREAMBLE\_Msg3}$, and parameters preambleInitialReceivedTargetPower ($P_{O\_PRE}$) and $\Delta_{PREAMBLE\_Msg3}$ are defined at the higher layer.

(6) If the terminal is configured with a higher layer parameter UplinkPowerControlDedicated-v12x0 for the serving cell c, and if the subframe i belongs to an uplink power control subframe set 2 indicated by using a higher layer parameter tpc-SubframeSet-r12, (6.1) for j=0 or j=1, $\alpha_c(j)=\alpha^{c,2}\in\{0, 0.4, 0.5, 0.6, 0.7, 0.8, 0.9, 1\}$, where $\alpha_c(j)=1$ is a parameter alpha-SubframeSet2-r12 provided at a higher layer; or for j=2, $\alpha_c(j)=1$.

Otherwise, (6.2) for j=0 or j=1, $\alpha_c\in\{0, 0.4, 0.5, 0.6, 0.7, 0.8, 0.9, 1\}$ is a 3-bit parameter provided at a higher layer; or for j=2, $\alpha_c(j)=1$.

(7) $PL_c$ is a propagation loss obtained by the terminal through estimation and calculation for the serving cell c, and $PL_c$=referenceSignalPower-higher layer reference signal received power (RSRP), where referenceSignalPower is provided at a higher layer. The RSRP is correspondingly defined for a reference serving cell.

(8) $\delta_{TF,c}(i)=10 \log_{10}((2^{BPRE\cdot K_1}-1)\cdot\beta_{offset}^{PUSCH})$.

(9) $\delta_{PUSCH,c}$ is a correlation value and is calculated based on a TPC command.

If the terminal is configured with a higher layer parameter UplinkPowerControlDedicated-v12x0 and if the subframe i belongs to an uplink power control subframe set 2 indicated by using a higher layer parameter tpc-SubframeSet-r12, a current PUSCH power control adjustment state is provided in $f_{c,2}(i)$, and the terminal replaces $f_c(i)$ with $f_{c,2}(i)$ to determine $P_{PUSCH,c}(i)$. Otherwise, a current PUSCH power control adjustment state is provided in $f_c(i)$, and $f_{c,2}(i)$ and $f_c(i)$ are defined as follows:

$f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$.

Mapping of the foregoing TPC command field may be shown in Table 1 and Table 2 below.

TABLE 1

| TPC command field in a DCI format 0/3/4 | Accumulated $\delta_{PUSCH}$ [dB] | Absolute $\delta_{PUSCH}$ [dB] in a DCI format 0/4 |
| --- | --- | --- |
| 0 | −1 | −4 |
| 1 | 0 | −1 |
| 2 | 1 | 1 |
| 3 | 3 | 4 |

TABLE 2

| TPC command field in a DCI format 3A | Accumulated $\delta_{PUSCH}$ [dB] |
| --- | --- |
| 0 | −1 |
| 1 | 1 |

It can be learned from the foregoing descriptions that if a format of DCI of the TPC command is 0/3/4/3A, it indicates that the TPC command is the accumulated-type command, and the terminal may determine an adjustment step, namely, accumulated $\delta_{PUSCH}$ based on a value of the TPC command field, to determine the transmit power on the PUSCH. If a format of DCI for transmitting the TPC command is 0/4, it indicates that the TPC command is the absolute-type command, and the terminal may determine a power adjustment value, namely, absolute $\delta_{PUSCH}$ based on a value of the TPC command field, to determine the transmit power on the PUSCH.

2. If the uplink channel is a PUCCH, the transmit power on the uplink channel is calculated as follows:

(1) The transmit power on the PUCCH in the subframe i is as follows:

$$P_{PUSCH,c}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g_c(i) \end{Bmatrix}$$

(2) If the terminal does not transmit the PUCCH for the serving cell, a PUCCH-related TPC command is accumulated. In this case, the transmit power on the PUCCH is as follows:

$$P_{PUCCH}(i) = \min \begin{Bmatrix} P_{CMAX}(i), \\ P_{0\_PUCCH} + PL_c + g_c(i) \end{Bmatrix}$$

Meanings of symbols and parameters are as follows:

(1) min represents acquisition of a minimum value, and log represents acquisition of a logarithm.

(2) $P_{CMAX,c}(i)$ is a configured maximum transmit power of the terminal in the subframe i for the serving cell c. If the terminal transmits the PUCCH without a PUSCH in the subframe i for the serving cell c, a received PUCCH-related TPC command in a DCI format 3/3A is accumulated. If the terminal transmits neither the PUCCH nor a PUSCH in the subframe i for the serving cell c, a received PUCCH-related TPC command in a DCI format 3/3A is accumulated, and $P_{CMAX,c}(i)$ is calculated by assuming that MPR=0 dB, A-MPR=0 dB, P-MPR=0 dB, and TC=0 dB. For a definition, refer to an existing standard, for example, 3GPP TS-GRAN 36.101.

(3) $\Delta_{F\_PUCCH}(F)$ is provided at a higher layer. Each $\Delta_{F\_PUCCH}(F)$ value corresponds to a PUCCH format (F) related to a PUCCH format 1A. The PUCCH format (F) is defined in Table 5.4-1 in 3GPP TS-GRAN 36.211. For example, Table 3 shows a supported PUCCH format below.

TABLE 3

| PUCCH format | Modulation scheme | A quantity $M_{bit}$ of bits in each subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

(4) If the terminal is configured by using a higher layer signaling to transmit the PUCCH on two antenna ports, $\Delta_{TxD}(F')$ is provided at the higher layer. A PUCCH format F' is defined in Table 5.4-1 (for example, Table 3 above) in 3GPP TS-GRAN 36.211. Otherwise, $\Delta_{TxD}(F')$.

(5) $h(n_{CQI}, n_{HARQ}, n_{SR})$ is a value related to a PUCCH format, where $n_{CQI}$ represents a quantity of information bits of channel quality information. If the subframe i is a scheduling request (SR) configuration subframe of a terminal that does not have any UL-SCH-related transport block, $n_{SR}=1$. Otherwise, $n_{SR}=0$, where $n_{HARQ}$, is a quantity of HARQ-ACK bits sent by the terminal.

(6) $P_{0\_PUCCH}$ is a parameter composed of a sum of a parameter $P_{O\_NOMINAL\_PUCCH}$ provided at the higher layer and a parameter $P_{O\_UE\_PUCCH}$ provided at the higher layer.

(7) $PL_c$ is a propagation loss obtained by the terminal through estimation and calculation for the serving cell c, and $PL_c$=referenceSignalPower-higher layer reference signal received power (RSRP), where referenceSignalPower is provided at the higher layer. The RSRP is correspondingly defined for a reference serving cell.

(8) $\delta_{PUCCH}$ is a correlation value and is calculated based on a TPC command.

$$g(i) = g(i-1) + \sum_{m=0}^{M-1} \delta_{PUCCH}(i - k_m),$$

where g(i) is a current PUCCH power control adjustment state, and g(0) is an initial value obtained after reset.

Mapping of the foregoing TPC command field may be shown in Table 4 and Table 5 below.

TABLE 4

| TPC command field in a DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC command field in a DCI format 3A | $\delta_{PUSCH}$ [dB] |
|---|---|
| 0 | −1 |
| 1 | 1 |

It can be learned from the foregoing descriptions that the terminal may determine an adjustment step, namely, $\delta_{PUCCH}$ based on a value of the TPC command field and a format of DCI for transmitting the TPC command, to determine the transmit power on the PUCCH.

The following describes, in detail with reference to the accompanying drawings, the solutions provided in the embodiments of this application.

Figure 2:
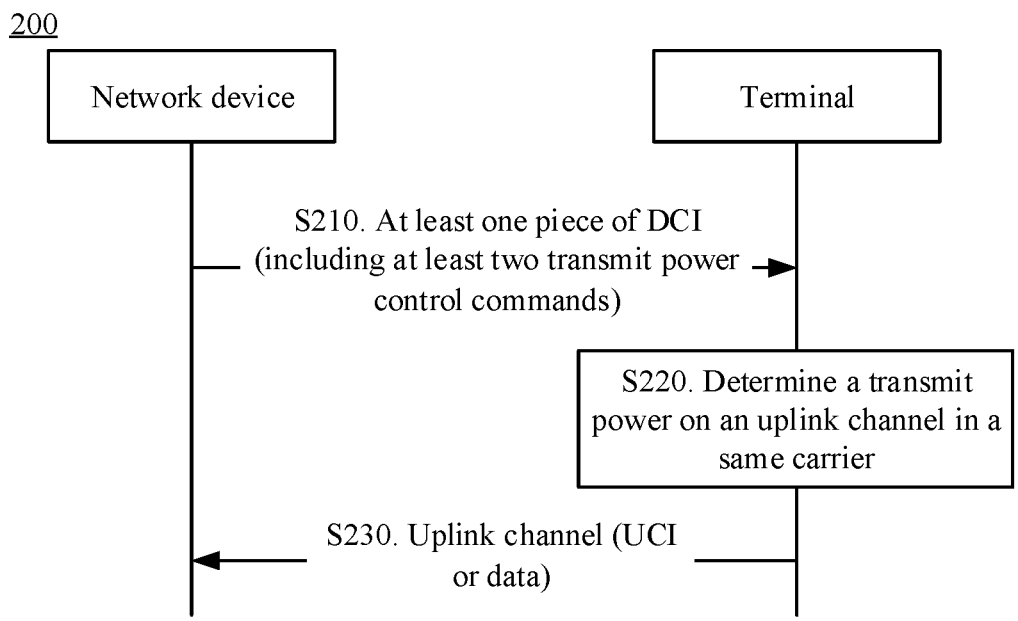
FIG. 2 is a schematic flowchart of a power control method in this application.

FIG. 2 is a schematic diagram of a power control method 200 according to an embodiment of this application. The method 200 may be applied to a communications system that performs communication by using a radio air interface. The communications system may include at least one network device and at least one terminal. For example, the communications system may be the wireless communications system 100 shown in FIG. 1.

In one embodiment, the network device may be a transmission reception point (TRP) or a base station, or may be another network device configured to send DCI. This is not limited in this application.

It should be understood that "first", "second", and the like in the embodiments of this application are merely used for distinguishing, but should not be construed as any limitation on the embodiments. For example, a first network device and a second network device are merely used to distinguish between different network devices.

S210. A terminal receives, on a same carrier, at least one piece of downlink control information DCI sent by at least one network device.

In one embodiment, the at least one piece of DCI includes a plurality of transmit power control commands of the terminal, and the plurality of transmit power control commands are in a one-to-one correspondence with a plurality of network devices. In other words, each transmit power control command corresponds to one network device, and the terminal may determine a transmit power on an uplink channel of the corresponding network device based on each transmit power control command.

For example, the at least one piece of DCI includes two transmit power control commands (for example, denoted as a first transmit power control command and a second transmit power control command). If the first transmit power control command corresponds to the first network device in the system 100, and the second transmit power control command corresponds to the second network device in the system 100, the terminal may determine, based on the first transmit power control command, a transmit power on an uplink channel (for example, denoted as a first uplink channel) corresponding to the first network device, and determine, based on the second transmit power control command, a transmit power on an uplink channel (for example, denoted as a second uplink channel) corresponding to the second network device.

It should be understood that the first uplink channel may be a PUCCH or a PUSCH, or the first uplink channel includes a PUCCH and a PUSCH. The second uplink channel may be a PUCCH or a PUSCH, or the second uplink channel includes a PUCCH and a PUSCH.

In addition, it should be noted that the at least one piece of DCI including the plurality of transmit power control commands may be scrambled by using a cell radio network temporary identifier (C-RNTI). The terminal descrambles the at least one piece of DCI by using the C-RNTI.

In the embodiments of this application, the DCI received by the terminal may be sent by a network device (for example, the first network device or the second network device in the system 100), or may be sent by a plurality of network devices (for example, the first network device and the second network device in the system 100). The following describes the two cases in detail.

Case 1:

The terminal receives, on a same carrier, at least one piece of DCI sent by a network device.

Generally, the case 1 is described below by using an example in which the terminal receives DCI from the first network device on the same carrier.

The case 1 may have two scenarios.

Scenario (1): The terminal receives, on the same carrier, at least two pieces of DCI (for example, first DCI and second DCI) sent by the first network device.

In one embodiment, each piece of DCI includes one of at least two transmit power control commands.

For example, the first DCI includes a first transmit power control command, and the second DCI includes a second transmit power control command. In addition, the first DCI may further include a transmit power control command of another terminal other than the first transmit power control command. Similarly, the second DCI may further include a transmit power control command of another terminal other than the second transmit power control command.

In one embodiment, the first DCI and the second DCI may be sent by the first network device in a time division manner. The first network device may send the first DCI at a first moment, and send the second DCI at a second moment. For example, the first network device may send the first DCI in a first subframe, a first slot, or a first mini-slot, and send the second DCI in a second subframe, a second slot, or a second mini-slot.

Scenario (2): The terminal receives, on the same carrier, one piece of DCI (for ease of description, denoted as target DCI below) sent by the first network device.

In one embodiment, the terminal receives the target DCI sent by the first network device. The target DCI includes at least two transmit power control commands of the terminal, for example, a first transmit power control command and a second transmit power control command.

It should be understood that the target DCI may include only a plurality of transmit power control commands of the terminal, or may include a transmit power control command of a terminal other than the terminal.

In one embodiment, a format of the target DCI may be any one of 3/3A/3B.

In this case, the target DCI may include transmit power control commands of a plurality of terminals. At least two transmit power control commands of each terminal are included. The at least two transmit power control commands of each terminal may occupy n bits, where n is a positive integer greater than 2.

For example, a quantity of transmit power control commands of each terminal is m (m≥2). The transmit power control commands of each terminal may occupy a*m (a*m=n) bits. Each transmit power control command may occupy a bits. Alternatively, each transmit power control command may occupy different bits. For example, when a=2 and m=2, the first transmit power control command and the second transmit power control command of each terminal may each occupy two bits. Alternatively, the first transmit power control command of each terminal may occupy one bit, and the second transmit power control command of each terminal may occupy three bits. A correspondence between a bit and a transmit power control command may be configured by the first network device by using higher layer signaling, or may be predefined by the first network device and the terminal. For example, when n=4, the first two bits in the n bits may represent the first transmit power control command, and the last two bits in the n bits may represent the second transmit power control command.

It should be understood that the foregoing descriptions are merely for example illustration, and are merely intended to help a person skilled in the art better understand this application. A correspondence between the n bits and the at least two transmit power control commands and a manner in which the terminal learns of the correspondence are not limited in this application.

In one embodiment, a format of the target DCI may be any one of 1A/1B/1D/1/2A/2/2B/2C/2D. In this case, the target DCI may include only at least two transmit power control commands of the terminal. The at least two transmit power control commands of the terminal may occupy n bits, where n is a positive integer greater than 2.

For example, the target DCI includes two transmit power control commands (a first transmit power control command and a second transmit power control command) of the terminal, and n=4. The first transmit power control command and the second transmit power control command may each occupy two bits. For example, the first transmit power control command occupies the first two bits, and the second transmit power control command may occupy the last two bits. For another example, the first transmit power control command occupies the last two bits, and the second transmit power control command may occupy the first two bits. In addition, the first transmit power control command may occupy one bit, and the second transmit power control command may occupy three bits. For example, the first transmit power control command may occupy the first one bit, and the second transmit power control command may occupy the last three bits. For another example, the first transmit power control command may occupy the last one bit, and the second transmit power control command may occupy the first three bits. A correspondence between a bit and a transmit power control command may be configured by using higher layer signaling, or may be predefined.

It should be understood that the foregoing descriptions are merely for example illustration, and are merely intended to help a person skilled in the art better understand this application. A correspondence between the n bits and the at least two transmit power control commands and a manner in which the terminal learns of the correspondence are not limited in this application.

Further, each of the at least two transmit power control commands may be represented by a number of a transmit power control command, for example, a number of a TPC command. For example, a number 1 of a TPC command may represent the first transmit power control command, and a number 2 of a TPC command may represent the second transmit power control command.

It should be understood that a correspondence between the number of the transmit power control command and the transmit power control command is not limited in this embodiment of this application. The correspondence may be configured by the first network device by using higher layer signaling, or may be predefined by the first network device and the terminal.

It should be further understood that the foregoing described format of the DCI is merely an example for description, and the format of the DCI may also be another format defined in future 5G The format of the DCI is not limited in the embodiments of this application.

It should be further noted that for the case 1, if the first network device is a network device in a cooperating cell, the first network device first obtains a C-RNTI of the terminal. For example, the first network device may obtain the C-RNTI from a network device (for example, the second network device) in a serving cell, and scramble, by using the C-RNTI, the DCI sent by the first network device.

Case 2:

The terminal receives, on a same carrier, one piece of DCI sent by each of a plurality of network devices (for example, the first network device and the second network device).

In this case, each piece of DCI includes one transmit power control command of the terminal.

For example, the terminal receives first DCI sent by the first network device, where the first DCI includes a first transmit power control command; and receives second DCI sent by the second network device, where the second DCI includes a second transmit power control command.

It should be noted that if the first network device is a network device in a cooperating cell, the first network device first needs to obtain a C-RNTI of the terminal from the second network device, and scramble the first DCI by using the C-RNTI. If the second network device is a network device in a cooperating cell, the second network device first needs to obtain a C-RNTI of the terminal from the first network device, and scramble the second DCI by using the C-RNTI.

This case is similar to the scenario (1) in the case 1. It should be understood that for the case 2 and the scenario (1) in the case 1, reference may be made to a related technology for sending a TPC command by a network device in the prior art. For brevity, details are not described herein again.

S220. The terminal determines a transmit power on an uplink channel in the same carrier based on at least two transmit power control commands.

For example, the terminal may determine the transmit power on the uplink channel based on an adjustment step or an absolute power adjustment value indicated by each transmit power control command.

In this case, if the at least two transmit power control commands are carried in one piece of DCI, for example, the foregoing target DCI, all of the at least two transmit power control commands are relative-type commands or absolute-type commands. In addition, if each of the at least two transmit power control commands is carried in one piece of DCI, some of the at least two transmit power control commands may be relative-type commands, and remaining transmit power control commands may be absolute-type commands. This is not limited in the embodiments of this application.

In one embodiment, when the terminal determines the transmit power on the uplink channel in the same carrier based on the at least two transmit power control commands, the terminal may first separately determine at least two candidate transmit powers based on the at least two transmit power control commands, where the at least two candidate transmit powers are in a one-to-one correspondence with the at least two transmit power control commands. Then, the terminal determines the transmit power on the uplink channel based on the at least two candidate transmit powers.

For example, the terminal may directly obtain a corresponding transmit power, namely, a candidate transmit power through calculation based on an adjustment step or an absolute power adjustment value corresponding to each transmit power control command. Then, the terminal determines the transmit power on the uplink channel based on a plurality of transmit powers obtained through calculation.

For example, the terminal may determine, as the transmit power on the uplink channel, a maximum transmit power or a minimum transmit power in the at least two candidate transmit powers, or an average value of the at least two candidate transmit powers.

The terminal uses the maximum transmit power in the at least two candidate transmit powers as the transmit power on the uplink channel, to improve transmission reliability. The terminal uses the minimum transmit power in the at least two candidate transmit powers as the transmit power on the uplink channel, to reduce interference to a neighboring terminal in a local cell.

For another example, the terminal may use a weighted sum of the at least two candidate transmit powers as the transmit power on the uplink channel. A weighted value of each candidate transmit power may be calculated by the terminal, may be configured by the network device, or may be predefined. This is not limited in the embodiments of this application.

In one embodiment, when the terminal determines the transmit power on the uplink channel in the same carrier based on the at least two transmit power control commands, the terminal may also directly determine the transmit power on the uplink channel based on one transmit power control command (for example, denoted as a target transmit power control command) in the at least two transmit power control commands.

In this case, the terminal does not need to calculate a candidate transmit power corresponding to each of the at least two transmit power control commands, but only needs to select one transmit power control command from the at least two transmit power control commands based on an actual performance requirement, and then determines the transmit power on the uplink channel based on the selected transmit power control command. For example, to ensure transmission reliability, the terminal may select, as the first transmit power control command, a transmit power control command indicating a maximum adjustment step or absolute power adjustment value. In other words, the target transmit power control command indicates the maximum adjustment step or absolute power adjustment value. For another example, to reduce interference to a neighboring terminal, the target transmit power control command may be a transmit power control command indicating a minimum adjustment step or absolute power adjustment value.

In an example instead of limitation, the terminal may determine the target transmit power control command based on at least one of a resource location of the at least one piece of DCI, an aggregation level of the at least one piece of DCI, a scrambling manner of the at least one piece of DCI, and first indication information included in the at least one piece of DCI.

In one embodiment, the terminal determines a transmit power control command included in candidate DCI as the target transmit power control command. The target DCI meets at least one of the following conditions:

(1) The target DCI is carried at a target resource location;
(2) the aggregation level of the target DCI is a target aggregation level;
(3) the scrambling manner of the target DCI is a target scrambling manner; and
(4) the first indication information included in the target DCI is target first indication information.

For example, in a protocol or a system, it may be specified that the terminal only uses a transmit power control command that meets any one or any combination of the foregoing conditions (1) to (4) as a valid transmit power control command, and considers a transmit power control command that does not meet a corresponding condition as an invalid transmit power control command.

In one embodiment, the network device may notify the terminal of at least one of the target resource location, the target aggregation level, the target scrambling manner, and the target first indication information by using higher layer signaling or DCI.

The following describes the foregoing described conditions in detail.

Condition (1):

In one embodiment, the target resource location may be any one or a combination of a target search space, a target candidate control channel set, a target carrier, and a target control resource set.

In an embodiment of this application, a time-frequency resource carrying the at least one piece of DCI is located in at least one search space of the terminal. The terminal determines, as the target transmit power control command, a transmit power control command included in DCI detected in a target search space in the at least one search space.

In one embodiment, the at least one search space is in a one-to-one correspondence with the at least one piece of DCI, in other words, each search space carries one piece of DCI. The terminal uses, as the target transmit power control command, the transmit power control command included in the DCI detected in the target search space (for example, denoted as a search space #J) in the at least one search space. In one embodiment, the at least one search space may be predefined or pre-configured.

Further, the search space #J corresponds to a serving network device of the terminal. In one embodiment, the serving network device may use a time-frequency resource in the search space #J, and a cooperating network device may use a time-frequency resource in another search space. In this case, the terminal may detect, in the search space #J, DCI sent by the serving network device, and detect, in the another search space, DCI sent by the cooperating network device. In other words, the DCI detected by the terminal in the search space #J is sent by the serving network device, and the DCI detected by the terminal in the another search space is sent by the cooperating network device. The terminal determines, as the target transmit power control command, a transmit power control command included in the DCI sent by the serving network device.

In another embodiment of this application, the at least one piece of DCI may be carried on at least one candidate control channel set in a same search space. The terminal determines, as the target transmit power control command, a transmit power control command included in DCI detected on a target candidate control channel set in the at least one candidate control channel set.

In one embodiment, the at least one candidate control channel set is in a one-to-one correspondence with the at least one piece of DCI, in other words, each candidate control channel set carries one piece of DCI. The terminal uses, as the target transmit power control command, the transmit power control command included in the DCI detected on the target candidate control channel set (for example, denoted as a candidate control channel set #Q) in the at least one candidate control channel set. In one embodiment, the at least one candidate control channel set may be predefined or pre-configured.

Further, the candidate control channel set #Q corresponds to a serving network device of the terminal. In one embodiment, the serving network device sends DCI on the candidate control channel set #Q, and a cooperating network device sends DCI on another candidate control channel set. Correspondingly, the terminal may detect, on the candidate control channel set #Q, the DCI sent by the serving network device, and detect, on the another candidate control channel set, the DCI sent by the cooperating network device. In other words, the DCI detected by the terminal on the candidate control channel set #Q is sent by the serving network device, and the DCI detected by the terminal on the another candidate control channel set is sent by the cooperating network device. The terminal determines, as the target transmit power control command, a transmit power control command included in the DCI sent by the serving network device.

In another embodiment of this application, the at least one piece of DCI may be carried on at least one carrier. The terminal determines, as the target transmit power control command, a transmit power control command included in DCI detected on a target carrier in the at least one carrier.

In one embodiment, the at least one carrier is in a one-to-one correspondence with the at least one piece of DCI, in other words, one piece of DCI is sent on each carrier. The terminal uses, as the target transmit power control command, the transmit power control command included in the DCI detected on the target carrier (for example, denoted as a carrier #R) in the at least one carrier. In one embodiment, the at least one carrier may be predefined or pre-configured.

Further, the carrier #R corresponds to a serving network device of the terminal. In one embodiment, the serving network device sends DCI on the carrier #R, and a cooperating network device sends DCI on another carrier in the at least one carrier. Correspondingly, the terminal may detect, on the carrier #R, the DCI sent by the serving network device, and detect, on the another carrier, the DCI sent by the cooperating network device. In other words, the DCI detected by the terminal on the carrier #R is sent by the serving network device, and the DCI detected by the terminal on the another carrier is sent by the cooperating network device. The terminal determines, as the target transmit power control command, a transmit power control command included in the DCI sent by the serving network device.

In another embodiment of this application, the at least one piece of DCI may be carried on at least one control resource set. The terminal determines, as the target transmit power control command, a transmit power control command included in DCI detected on a target control resource set in the at least one control resource set.

In one embodiment, the at least one control resource set is in a one-to-one correspondence with the at least one piece of DCI, in other words, one piece of DCI is sent on a resource in each control resource set. The terminal uses, as the target transmit power control command, the transmit power control command included in the DCI detected on the target control resource set (for example, denoted as a control resource set #V) in the at least one control resource set. In one embodiment, the at least one control resource set may be predefined or pre-configured.

Further, the control resource set #V corresponds to a serving network device of the terminal. In one embodiment, the serving network device sends DCI on a resource in the control resource set #V, and a cooperating network device sends DCI on a resource in another control resource set. Correspondingly, the terminal may detect, on the resource in the control resource set #V, the DCI sent by the serving network device, and detect, on the resource in the another control resource set, the DCI sent by the cooperating network device. In other words, the DCI detected by the terminal on the resource in the control resource set #V is sent by the serving network device, and the DCI detected by the terminal on the resource in the another control resource set is sent by the cooperating network device. The terminal determines, as the target transmit power control command, a transmit power control command included in the DCI sent by the serving network device.

It should be understood that the foregoing search space, candidate control channel set, control resource set, and carrier are merely examples for describing a manner in which the terminal determines the target transmit power control command based on a location of the detected DCI, but should not be construed as any limitation on this application. In this application, the terminal may also define a DCI location or distinguish between DCI locations in another manner. For example, the terminal may define the DCI location or distinguish between the DCI locations by using a time-frequency resource location, a subcarrier spacing, or the like. This is not limited in the embodiments of this application.

Condition (2):

In one embodiment, the at least one piece of DCI received by the terminal is generated by using at least one aggregation level. The terminal determines, as the target transmit power control command, a transmit power control command included in DCI using a target aggregation level in the at least one aggregation level.

In one embodiment, the at least one aggregation level is in a one-to-one correspondence with the at least one piece of DCI, in other words, different pieces of DCI are generated by using different aggregation levels. The terminal may use, as the target transmit power control command, the transmit power control command included in the DCI whose aggregation level is the target aggregation level (for example, denoted as an aggregation level #S). In one embodiment, the at least one aggregation level may be predefined or pre-configured.

Further, the aggregation level #S corresponds to a serving network device of the terminal. In one embodiment, the serving network device generates DCI #S based on the aggregation level #S, and sends the DCI #S to the terminal. In this case, the terminal determines, as the target transmit power control command, a transmit power control command included in the DCI sent by the serving network device.

Condition (3):

In one embodiment, the at least one piece of DCI may be scrambled in at least one scrambling manner. The terminal determines, as the target transmit power control command, a transmit power control command included in DCI to which a target scrambling manner in the at least one scrambling manner is applied.

In one embodiment, the at least one scrambling manner is in a one-to-one correspondence with the at least one piece of DCI, in other words, different pieces of DCI are generated in different scrambling manners. After receiving the at least one piece of DCI, the terminal descrambles respective DCI in a descrambling manner corresponding to each of the at least one scrambling manner. If a piece of DCI may be descrambled in a target descrambling manner (for example, denoted as a descrambling manner #T, where the descrambling manner #T corresponds to a scrambling manner #T), a transmit power control command included in the DCI is determined as the target transmit power control command. In one embodiment, the at least one scrambling manner may be predefined or pre-configured.

Further, cyclic redundancy check (CRC) scrambling may be performed on the DCI by using a terminal identity (UE identity, UE ID) and a cell identity (cell ID). For example, the UE ID may be cell radio network temporary identifier (C-RNTI). For example, the cell ID may be a physical cell ID (PCI).

In one embodiment, the scrambling manner #T corresponds to a serving network device of the terminal. In one embodiment, the serving network device generates DCI #T in the scrambling manner #T, and sends the DCI #T to the terminal. In this case, the terminal can descramble the DCI #T in the descrambling manner #T, to determine, as the target transmit power control command, a transmit power control command included in the DCI #T (namely, the DCI sent by the serving network device).

It should be understood that the at least one scrambling manner is not limited in this embodiment of this application, provided that the scrambling manner #T corresponds to the serving network device. It should be further understood that the UE ID and the cell identity are not limited in this embodiment of this application, either. The foregoing enumerated UE ID and cell identity are merely examples for description.

Condition (4):

In one embodiment, each of the at least one piece of DCI may include first indication information. For example, the first indication information may be one bit (1 bit) in the DCI, and the bit may be '1' or '0'. In this embodiment of this application, it may be specified or pre-configured that the terminal uses, as the target transmit power control command, a transmit power control command included in the DCI in which the first indication information is target first indication information, for example, the first indication information is '1'.

In one embodiment, the first indication information may be a part of a transmit power control command.

In one embodiment, the first indication information may be used to indicate whether corresponding DCI is sent by a serving network device or sent by a cooperating network device. For example, when the bit is '0', it indicates that the corresponding DCI is sent by the cooperating network device; or when the bit is '1', it indicates that the corresponding DCI is sent by the serving network device. Therefore, the terminal uses, as the target transmit power control command, the transmit power control command included in the DCI including the first indication information '1'. In other words, the terminal determines, as the target transmit power control command, the transmit power control command included in the DCI sent by the serving network device.

It should be understood that the foregoing conditions (1) to (4) may be combined for use. In this case, the terminal uses, as the target transmit power control command, a transmit power control command in DCI that meets any combination of the conditions (1) to (4). For brevity, a case in which the conditions (1) to (4) are combined for use is not described in detail herein. For details, refer to the foregoing descriptions of the conditions (1) to (4).

In another embodiment of this application, the terminal may first determine candidate DCI (for example, denoted as DCI #D) in the at least one piece of DCI, and then determine a transmit power control command in the DCI #D as the target transmit power control command.

In one embodiment, the candidate DCI is determined through predefining or determined through interaction between the terminal and the network device. For example, it is specified through predefining or through the interaction between the terminal and the network device that the candidate DCI is the DCI sent by the serving network device. The terminal only uses, as a valid transmit power control command, the transmit power control command in the DCI sent by the serving network device, but ignores a transmit power control command sent by the cooperating network device. In this case, the terminal needs to identify which DCI is sent by the serving network device and which DCI is sent by the cooperating network device.

In one embodiment, the terminal may determine the DCI #D based on any one of a location of the detected DCI, an aggregation level of the detected DCI, a scrambling manner of the detected DCI, and second indication information included in the detected DCI, to determine the target transmit power control command.

In one embodiment, the serving network device and the cooperating network device may send the DCI based on at least one of the following: different resource locations, different aggregation levels, different scrambling manners, and different second indication information. DCI information may be pre-specified or configured in a system or a protocol. The DCI information may be defined as at least one of a location of the DCI sent by the serving network device, an aggregation level of the DCI sent by the serving network device, a scrambling manner of the DCI sent by the serving network device, and second indication information included in the DCI sent by the serving network device. Because the DCI information is stored on both a network device side and a terminal side, the terminal may determine, based on at least one of a corresponding location of each of the detected at least one piece of DCI, an aggregation level of each of the detected at least one piece of DCI, a scrambling manner of each of the detected at least one piece of DCI, and second indication information included in each of the detected at least one piece of DCI, the DCI sent by the serving network device, namely, the DCI #D.

It should be understood that the second indication information may be used to indicate whether corresponding DCI is sent by the serving network device or sent by the cooperating network device. For example, the second indication information may be the same as the first indication information. For details about the second indication information, refer to the foregoing description of the first indication information. For brevity, the details are not described herein again.

In one embodiment, when determining the DCI #D based on the location of the detected DCI, the terminal may determine the DCI #D based on a search space, a candidate control channel set, or a carrier in which the DCI is located.

It should be understood that, in one embodiment, in which the terminal determines the DCI #D based on any one of the location of the detected DCI, the aggregation level of the detected DCI, the scrambling manner of the detected DCI, and the second indication information included in the detected DCI, reference may be made to the corresponding description in the foregoing manner 2. For brevity, details are not described herein again.

It should be further understood that the candidate DCI may also be the DCI sent by the cooperating network device. This is not limited in the embodiments of this application.

In one embodiment, the information that needs to be pre-configured in this application, for example, the foregoing described search space and aggregation level may be configured by using higher layer signaling such as radio resource control (RRC) signaling or media access control element (MAC CE).

It should be understood that the terminal may determine the transmit power on the uplink channel in the same carrier based on the at least two transmit power control commands in a plurality of manners. The foregoing description is merely an example intended to help a person skilled in the art better understand this application, but should not be construed as any limitation on this application.

An example in which the at least two transmit power control commands received by the terminal are TPC command 1 and TPC command 2 is used below to describe a plurality of embodiments in which the terminal determines the transmit power on the uplink channel based on the adjustment step or the absolute power adjustment value.

If the terminal is located in a serving cell c, and a network device in the serving cell c is the first network device, a transmit power calculated below is a transmit power on an uplink channel transmitted by the terminal in a subframe i for the serving cell c. In this embodiment of this application, the transmit power on the uplink channel transmitted by the terminal in the subframe i for the serving cell c may be used as the transmit power on the uplink channel.

It should be understood that a result obtained through calculation according to the following formula is in a unit of dBm.

1. If the uplink channel is a PUSCH, the transmit power on the PUSCH may be calculated in the following manner:

(1) If the PUSCH is transmitted in the subframe i but a PUCCH is not transmitted at the same time, the transmit power on the PUSCH may be determined according to any one of the following formulas:

$$P_{PUSCH,c}(i) = \min\left\{\begin{array}{l} P_{CMAX,c}(i), \\ \min\left\{\begin{array}{l} 10\log_{10}(M_{PUSCH,c}(i)) + P_{O\_PUSCH,c}(j) + \\ \alpha_c(j)\cdot PL_c + \Delta_{TF,c}(i) + f_{1c}(i) \\ 10\log_{10}(M_{PUSCH,c}(i)) + P_{O\_PUSCH,c}(j) + \\ \alpha_c(j)\cdot PL_c + \Delta_{TF,c}(i) + f_{2c}(i) \end{array}\right\} \end{array}\right\}$$

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j)\cdot PL_c + \Delta_{TF,c}(i) + \min\left\{\begin{array}{l} f_{1c}(i) \\ f_{2c}(i) \end{array}\right\} \end{array}\right\}$$

$$P_{PUSCH,c}(i) = \min\left\{\begin{array}{l} P_{CMAX,c}(i), \\ k_{11}S_{11} + k_{12}S_{12} \end{array}\right\}$$

(2) If the PUSCH and a PUCCH are simultaneously transmitted in the subframe i, the transmit power on the PUSCH may be determined according to any one of the following formulas:

$$P_{PUSCH,c}(i) = \min\left\{\begin{array}{l} 10\log_{10}(\hat{P}_{CMAX,c}(i) - \hat{P}_{PUCCH}(i)), \\ \min\left\{\begin{array}{l} 10\log_{10}(M_{PUSCH,c}(i)) + P_{O\_PUSCH,c}(j) + \\ \alpha_c(j)\cdot PL_c + \Delta_{TF,c}(i) + f_{1c}(i) \\ 10\log_{10}(M_{PUSCH,c}(i)) + P_{O\_PUSCH,c}(j) + \\ \alpha_c(j)\cdot PL_c + \Delta_{TF,c}(i) + f_{2c}(i) \end{array}\right\} \end{array}\right\}$$

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j)\cdot PL_c + \Delta_{TF,c}(i) + \min\left\{\begin{array}{l} f_{1c}(i) \\ f_{2c}(i) \end{array}\right\} \end{array}\right\}$$

$$P_{PUSCH,c}(i) = \min\left\{\begin{array}{l} 10\log_{10}(\hat{P}_{CMAX,c}(i) - \hat{P}_{PUCCH}(i)), \\ k_{21}S_{11} + k_{22}S_{12} \end{array}\right\}$$

(3) If the PUSCH is not transmitted in the subframe i, a received PUCCH-related transmit power control command in a DCI format 3/3A is accumulated. In this case, the transmit power on the PUSCH may be determined according to any one of the following formulas:

$$P_{PUSCH,c}(i) = \min\left\{\begin{array}{l} P_{CMAX,c}(i), \\ P_{O\_PUSCH,c}(1) + \alpha_c(1)\cdot PL_c + \min\{f_{1c}(i), f_{2c}(i)\} \end{array}\right\}$$

$$P_{PUSCH,c}(i) = \min\left\{\begin{array}{l} P_{CMAX,c}(i), \\ \min\left\{\begin{array}{l} P_{O\_PUCCH,c} + \alpha_c(1)\cdot PL_c + g_{1c}(i), \\ P_{O\_PUCCH,c} + \alpha_c(1)\cdot PL_c + g_{2c}(i) \end{array}\right\} \end{array}\right\}$$

$$P_{PUSCH,c}(i) = \min\left\{\begin{array}{l} P_{CMAX,c}(i), \\ k_{31}(P_{O\_PUSCH,c} + \alpha_c(1)\cdot PL_c + f_{1c}(i)) + \\ k_{32}(P_{O\_PUSCH,c}(1) + PL_c + f_{2c}(i)) \end{array}\right\}$$

Herein, for definitions of the foregoing parameters, for example, $P_{CMAX,c}(i)$, $M_{PUSCH,c}(i)$, and $\alpha_c(j)$, refer to the foregoing description. For brevity, details are not described herein again.

It should be noted that $PL_c$ herein is a propagation loss that is from the first network device to the terminal and that is obtained by the terminal through estimation and calculation. It should be further noted that $f_{1c}(i)$ and $f_{2c}(i)$ correspond to $f_c(i)$ described above, $f_{1c}(i)$ is determined based on an adjustment step or an absolute power adjustment value indicated by the TPC command 1, and $f_{2c}(i)$ is determined based on an adjustment step or an absolute power adjustment value indicated by the TPC command 2.

In addition, $S_{11} = 10\log_{10}(M_{PUSCH,c}(i)) + P_{O\_PUSCH,c}(j) + \alpha_c(j)\cdot PL_c + \Delta_{TF,c}(i) + f_{1c}(i)$, and $S_{12} = 10\log_{10}(M_{PUSCH,c}(i)) + P_{O\_PUSCH,c}(j) + \alpha_c(j)\cdot PL_c + \Delta_{TF,c}(i) + f_{2c}(i)$ In addition, values of $k_{11}$, $k_{12}$, $k_{21}$, $k_{22}$, $k_{31}$, and $k_{32}$ are all greater than or equal to 0, and may be the same or different. $k_{11}$, $k_{12}$, $k_{21}$, $k_{22}$, $k_{31}$, and $k_{32}$ may be pre-configured, or may be pre-obtained by the terminal from the network device, or may be obtained by the terminal through calculation. A source thereof is not limited in this embodiment of this application.

Therefore, the terminal may determine the transmit power on the PUSCH (an example of the uplink channel) according to any one of the foregoing formulas.

2. If the uplink channel is a PUCCH, the transmit power on the PUCCH may be calculated in the following manner:

(1) The transmit power on the PUCCH in the subframe i is as follows:

$$P_{PUCCH,c}(i) = \min\left\{\begin{array}{l} P_{CMAX,c}(i), \\ \min\left\{\begin{array}{l} P_{0\_PUCCH} + PL_c + h(n_{CQI}, n_{HARQ}, n_{SR}) + \\ \Delta_{F\_PUCCH}(F) + \Delta_{TxD}(F') + g_{1c}(i) \\ P_{0\_PUCCH} + PL_c + h(n_{CQI}, n_{HARQ}, n_{SR}) + \\ \Delta_{F\_PUCCH}(F) + \Delta_{TxD}(F') + g_{2c}(i) \end{array}\right\} \end{array}\right\}$$

$$P_{PUCCH,c}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \\ \Delta_{TxD}(F') + \min\left\{\begin{array}{l} g_{1c}(i) \\ g_{2c}(i) \end{array}\right\} \end{array}\right\}$$

$$P_{PUSCH,c}(i) = \min\left\{\begin{array}{l} P_{CMAX}(i), \\ k_{41}T_{11} + k_{42}T_{12} \end{array}\right\}$$

(2) If the terminal does not transmit the PUCCH for the serving cell, a PUCCH-related TPC command is accumulated. In this case, the transmit power on the PUCCH is as follows:

$$P_{PUCCH}(i) = \min\left\{\begin{array}{l} P_{CMAX}(i), \\ \min\left\{\begin{array}{l} P_{0\_PUCCH} + PL_c + g_{1c}(i), \\ P_{0\_PUCCH} + PL_c + g_{2c}(i) \end{array}\right\} \end{array}\right\}$$

$$P_{PUCCH}(i) = \min\left\{\begin{array}{l} P_{CMAX}(i), \\ P_{0\_PUCCH} + PL_c + \min\left\{\begin{array}{l} g_{1c}(i), \\ g_{2c}(i) \end{array}\right\} \end{array}\right\}$$

-continued $$P_{PUCCH}(i) = \min \begin{Bmatrix} P_{CMAX}(i), \\ k_{51}(P_{0\_PUCCH} + PL_c + g_{1c}(i)) + k_{52}(P_{0\_PUCCH} + PL_c + g_{2c}(i)) \end{Bmatrix}$$

For definitions of the foregoing parameters, refer to the foregoing description. For brevity, details are not described herein again.

It should be noted that $PL_c$ herein is a propagation loss that is from the first network device to the terminal and that is obtained by the terminal through estimation and calculation. It should be further noted that $g_{1c}(i)$ and $g_{2c}(i)$ correspond to $g_c(i)$ described above, $g_{1c}(i)$ is determined based on an adjustment step indicated by the TPC command 1, and $f_{2c}(i)$ is determined based on an adjustment step indicated by the TPC command 2.

In addition, $$T_{11} = P_{0\_PUCCH} + PL_c + h(n_{CQI}, n_{HARQ}, n_{SR}) + \Delta_{F\_PUCCH}(F) + \Delta_{TxD}(F) + g_{1c}(i), \text{ and}$$

$$T_{12} = P_{0\_PUCCH} + PL_c + h(n_{CQI}, n_{HARQ}, n_{SR}) + \Delta_{F\_PUCCH}(F) + \Delta_{TxD}(F) + g_{2c}(i).$$

In addition, values of $k_{41}$, $k_{42}$, $k_{51}$, and $k_{52}$ are all greater than or equal to 0, and may be the same or different. $k_{41}$, $k_{42}$, $k_{51}$, and $k_{52}$ may be pre-configured, or may be pre-obtained by the terminal from the network device, or may be obtained by the terminal through calculation. A source thereof is not limited in this embodiment of this application.

Therefore, the terminal may determine the transmit power on the PUCCH (another example of the uplink channel) according to any one of the foregoing formulas.

It should be understood that the foregoing embodiment in which the terminal determines the transmit power on the uplink channel based on the adjustment step or the absolute power adjustment value is merely an example for description, and is merely intended to help a person skilled in the art better understand this application, but should not be construed as any limitation on this application.

In one embodiment, the method may further include the following operation:

S230. The terminal sends the uplink channel to the at least one network device on the same carrier.

In one embodiment, the terminal sends UCI or data based on the transmit power on the uplink channel that is determined in operation S220. The UCI or the data is carried on the uplink channel.

Therefore, according to the power control method in this embodiment of this application, the terminal can determine the transmit power on the uplink channel based on the plurality of transmit power control commands, thereby ensuring efficient and proper power allocation and improving overall system performance.

Figure 3:
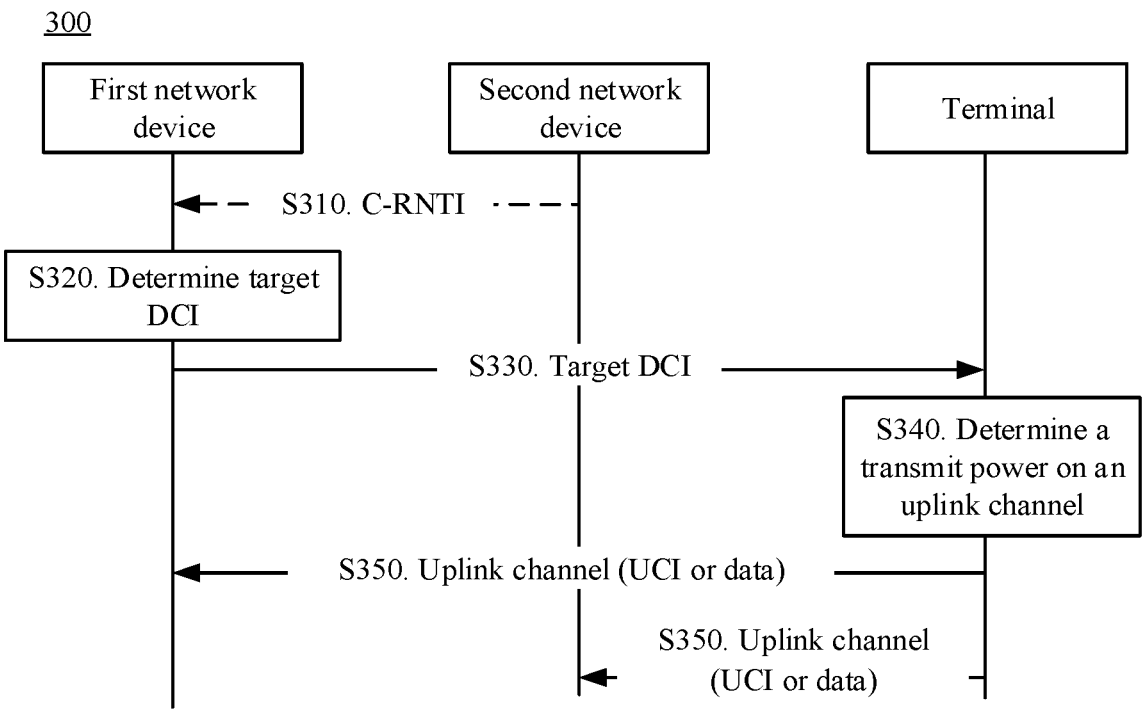
FIG. 3 is a schematic flowchart of an embodiment of a power control method in this application.
Figure 4:
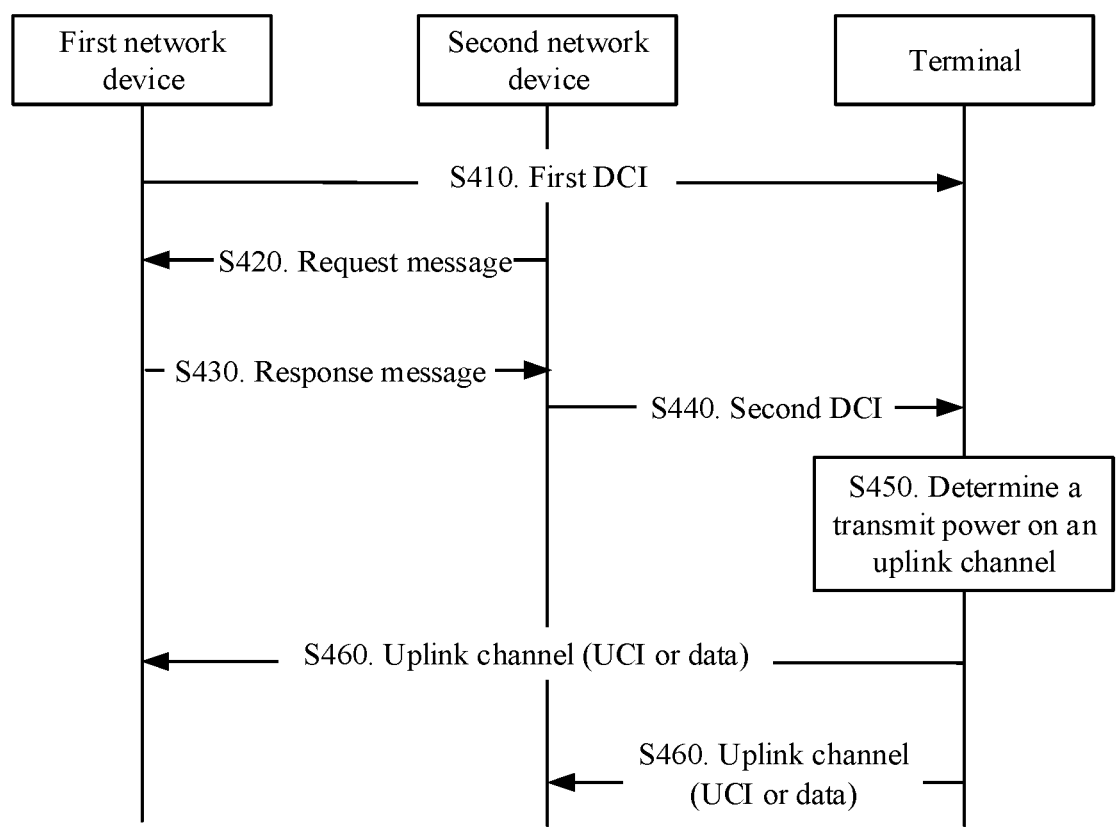
FIG. 4 is a schematic flowchart of another embodiment of a power control method in this application.

The following describes in detail two embodiments of a power control method in this application with reference to FIG. 3 and FIG. 4 and an example in which the terminal feeds back the CSI and that is described in the background.

FIG. 3 is a schematic diagram of a power control method 300 of an embodiment in this application.

In one embodiment, S310. A first network device obtains a C-RNTI of a terminal from a second network device.

If the first network device is a network device in a cooperating cell, the first network device needs to obtain the C-RNTI of the terminal from a network device in a serving cell, namely, the second network device. If the first network device is a network device in a serving cell, the first network device does not need to perform this operation.

S320. The first network device determines target DCI.

In one embodiment, the target DCI includes a first transmit power control command and a second transmit power control command of the terminal. The target DCI is scrambled by using the C-RNTI of the terminal.

If the terminal needs to send DCI or data for the first network device to the first network device after receiving the target DCI, the terminal may determine, based on the first transmit power control command, a transmit power on a first uplink channel that carries the DCI or the data for the first network device. Similarly, the terminal may determine a transmit power on a second uplink channel that carries DCI or data for the second network device.

For the target DCI, refer to the foregoing description. For brevity, details are not described herein again.

S330. The first network device sends the target DCI to the terminal on a same carrier.

Correspondingly, the terminal receives the target DCI, and descrambles the target DCI based on the C-RNTI of the terminal. Then, the terminal may determine the first transmit power control command and the second transmit power control command based on higher layer signaling or according to a predefined rule.

S340. The first network device determines a transmit power on an uplink channel in the same carrier based on a first transmit power control command and a second transmit power control command.

For example, the first network device determines, as the transmit power on the uplink channel, a transmit power determined based on the first transmit power control command, or determines, as the transmit power on the uplink channel, a weighted sum of the first transmit power control command and the second transmit power control command. For details, refer to the foregoing description. For brevity, the details are not described herein again.

S350. The terminal sends the uplink channel to the first network device and the second network device on the same carrier.

The uplink channel carries CSI 1 between the terminal and the first network device, and CSI 2 between the terminal and the second network device.

Therefore, according to the power control method in this embodiment of this application, the terminal can determine the transmit power on the uplink channel based on a plurality of transmit power control commands, thereby ensuring efficient and proper power allocation and improving overall system performance.

FIG. 4 is a schematic diagram of a power control method of another embodiment in this application. In the embodiment shown in FIG. 4, an example in which a first network device is a network device in a serving cell, and a second network device is a network device in a cooperating cell is used for description.

S410. The first network device sends first DCI to a terminal, where the first DCI includes a first transmit power control command.

If the terminal needs to send DCI or data for the first network device to the first network device after receiving the first DCI, the terminal may determine, based on the first transmit power control command, a transmit power on a first uplink channel that carries the DCI or the data for the first network device.

It should be understood that for a form or format of the first DCI and/or a form or format of the first transmit power control command, reference may be made to the foregoing description.

S420. The second network device sends a request message to the first network device, where the request message is used to obtain a C-RNTI of the terminal.

S430. The first network device sends a response message to the second network device based on the request message, where the response message includes the C-RNTI of the terminal.

It should be understood that operation S410 may be performed before operations S420 and S430, or may be performed after operations S420 and S430, or may be performed simultaneously with operations S420 and S430. This is not limited in this embodiment of this application.

S440. The second network device sends second DCI to the terminal, where the second DCI includes a second transmit power control command.

It should be understood that the second DCI is scrambled by using the C-RNTI of the terminal.

Similar to S410, the terminal may determine, based on the second DCI, a transmit power on a second uplink channel that carries DCI or data for the second network device.

It should be understood that for a form or format of the second DCI and/or a form or format of the second transmit power control command, reference may be made to the foregoing description.

S450. The terminal determines a transmit power on an uplink channel in a same carrier based on the first transmit power control command and the second transmit power control command.

In one embodiment, the uplink channel carries CSI 1 between the terminal and the first network device, and CSI 2 between the terminal and the second network device.

It should be understood that for details of determining the transmit power on the uplink channel by the terminal based on the first transmit power control command and the second transmit power control command, reference may be made to the foregoing description. For brevity, the details are not described herein again.

S460. The terminal sends the uplink channel on the same carrier based on the transmit power on the uplink channel.

Therefore, according to the power control method in this embodiment of this application, the terminal can determine the transmit power on the uplink channel based on a plurality of transmit power control commands, thereby ensuring efficient and proper power allocation and improving overall system performance.

Figure 5:
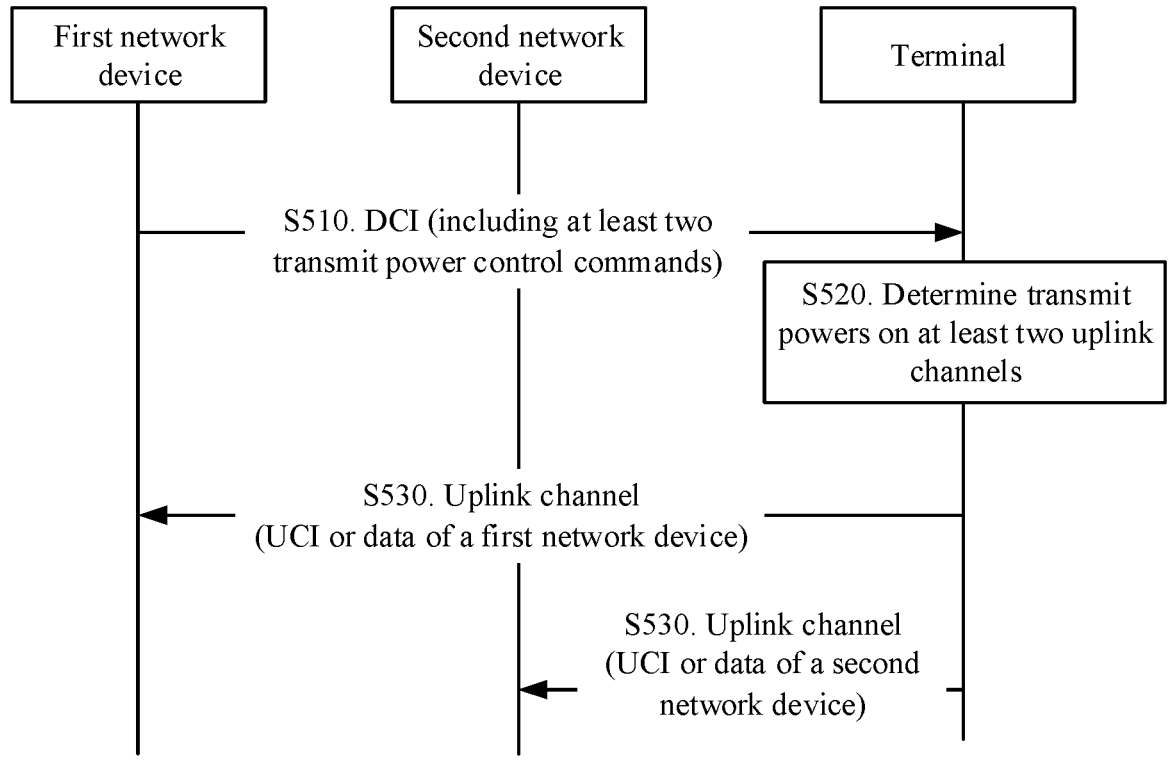
FIG. 5 is a schematic flowchart of another power control method in this application.

FIG. 5 is a schematic diagram of another power control method 500 in this application. The method 500 may be applied to a communications system that performs communication by using a radio air interface. The communications system may include at least two network devices and at least one terminal. For example, the communications system may be the wireless communications system 100 shown in FIG. 1.

In one embodiment, the network device may be a transmission reception point (TRP) or a base station, or may be another network device configured to send DCI. This is not limited in this application.

In one embodiment, the network device may be a network device in a serving cell, or may be a network device in a cooperating cell. This is not limited in this application.

S510. The terminal receives, on a same carrier, downlink control information DCI sent by a network device (denoted as a first network device below for ease of description).

In one embodiment, the DCI includes at least two transmit power control commands of the terminal. The at least two transmit power control commands are in a one-to-one correspondence with the at least two network devices. The at least two network devices include the first network device.

In one embodiment, a format of the DCI may be any one of 1A/1B/1D/1/2A/2/2B/2C/2D, or a format of the DCI may be any one of 3/3A/3B.

In one embodiment, the at least two transmit power control commands occupy n bits, where n is a positive integer greater than 2.

Further, a correspondence between the n bits and the at least two transmit power control commands is configured by using higher layer signaling or predefined. For details, refer to the foregoing description. For brevity, the details are not described herein again.

S520. The terminal determines a transmit power on an uplink channel of each of the at least two network devices based on at least two transmit power control commands.

For example, the DCI includes two transmit power control commands (for example, denoted as a first transmit power control command and a second transmit power control command). If the first transmit power control command corresponds to the first network device in the system 100, and the second transmit power control command corresponds to the second network device in the system 100, the terminal may determine, based on the first transmit power control command, a transmit power on an uplink channel (for example, denoted as a first uplink channel) corresponding to the first network device, and determine, based on the second transmit power control command, a transmit power on an uplink channel (for example, denoted as a second uplink channel) corresponding to the second network device.

It should be understood that the first uplink channel may be a PUCCH or a PUSCH, or the first uplink channel includes a PUCCH and a PUSCH. The second uplink channel may be a PUCCH or a PUSCH, or the second uplink channel includes a PUCCH and a PUSCH.

In addition, it should be noted that the DCI may be scrambled by using a cell radio network temporary identifier (C-RNTI). If the first network device that sends the DCI is the network device in the cooperating cell, the first network device may first obtain the C-RNTI from the network device in the serving cell, and then scramble the DCI by using the C-RNTI. After receiving the DCI, the terminal descrambles the DCI by using the C-RNTI.

In one embodiment, the terminal may determine the transmit power on the uplink channel of each network device based on an adjustment step or an absolute power adjustment value indicated by each of the at least two transmit power control commands.

For example, when the transmit power control command is a relative-type command, the terminal may determine an adjustment step of the transmit power on the first uplink channel based on the first transmit power control command, to determine the transmit power on the first uplink channel; and determine an adjustment step of the transmit power on the second uplink channel based on the second transmit power control command, to determine the transmit power on the second uplink channel. Alternatively, when the transmit power control command is an absolute-type command, the terminal may determine an absolute power adjustment value of the transmit power on the first uplink channel based on the first transmit power control command, to determine the transmit power on the first uplink channel; and determine an absolute power adjustment value of the transmit power on the second uplink channel based on the second transmit power control command, to determine the transmit power on the second uplink channel.

In one embodiment, the terminal may determine the transmit power on the uplink channel of each of the at least two network devices based on the at least two transmit power control commands and a propagation loss corresponding to a corresponding uplink channel.

Further, the terminal may determine a transmit power on the corresponding uplink channel with reference to the adjustment step indicated by the transmit power control command and the propagation loss corresponding to the corresponding uplink channel or with reference to the absolute power adjustment value and the propagation loss corresponding to the corresponding uplink channel.

For example, the terminal may determine the transmit power on the first uplink channel with reference to a propagation loss from the first network device to the terminal based on the adjustment step or the absolute power adjustment value indicated by the first transmit power control command, and determine the transmit power on the second uplink channel with reference to a propagation loss from the second network device to the terminal based on the adjustment step or the absolute power adjustment value indicated by the second transmit power control command.

For example, when both the first uplink channel and the second uplink channel are PUSCHs, and the PUSCHs and a PUCCH are simultaneously transmitted, the transmit power $P_{PUSCH,c}(i)$ on the first uplink channel is as follows:

$$P_{PUSCH1,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_2 + \Delta_{TF,c}(i) + f_{2c}(i) \end{array} \right\}$$

The transmit power $P_{PUSCH2,c}(i)$ on the second uplink channel is as follows:

$$P_{PUSCH2,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_1 + \Delta_{TF,c}(i) + f_{1c}(i) \end{array} \right\}$$

In the foregoing formula, for a same parameter, refer to the foregoing description.

Herein, $PL_1$ represents a propagation loss that is from the terminal to the first network device and that is obtained by the terminal through estimation and calculation, $PL_2$ represents a propagation loss that is from the terminal to the second network device and that is obtained by the terminal through estimation and calculation, $f_{1c}(i)$ is determined based on the adjustment step or the absolute power adjustment value indicated by the first transmit power control command, and $f_{2c}(i)$ is determined based on the adjustment step or the absolute power adjustment value indicated by the second transmit power control command.

In this embodiment of this application, the propagation loss corresponding to the uplink channel corresponding to each network device may be determined by using indication information in the DCI or indication information in higher layer signaling. For example, the first network device may instruct, by using the DCI or the higher layer signaling, the terminal to use $PL_1$ to calculate $P_{PUSCH1,c}(i)$, and to use $PL_2$ to calculate $P_{PUSCH2,c}(i)$.

A method for determining a propagation loss (for example, denoted as a first propagation loss) corresponding to a first PUCCH is described below in detail by using the uplink channel corresponding to the first network device as the first PUCCH. First, it should be understood that in this application, the uplink channel corresponding to each network device may be configured by using the higher layer signaling. The network device may trigger an uplink channel resource by using the DCI, and the terminal may send the uplink channel on the uplink channel resource triggered by the network device.

It should be further understood that an ACK/a NACK may be transmitted on the first PUCCH, and information other than the ACK/NACK may be further transmitted on the first PUCCH, for example, CSI. Content of the information transmitted on the PUCCH is not limited in this application.

In one embodiment, the uplink channel resource may include at least one of the following: a time domain resource (for example, a start orthogonal frequency division multiplexing (OFDM) symbol and an end OFDM symbol that are occupied by the PUCCH in a time unit, or a quantity of OFDM symbols occupied by a start symbol occupied by the PUCCH in a time unit), a frequency domain resource, a used numerology such as a subcarrier spacing, and a used sequence.

The time unit may be a subframe, a slot, a mini-slot, a time unit defined in an NR system, or a time unit defined in a future system. This is not limited in the embodiments of this application.

For ease of understanding, embodiments of this application are described below by using an example in which first DCI triggers a first PUCCH resource and the terminal sends the first PUCCH to the first network device on the first PUCCH resource.

It should be understood that the first DCI may also be used to schedule a PDSCH (for example, denoted as a first PDSCH) while triggering the first PUCCH resource. The first PDSCH may be used to transmit downlink data of the first network device, and a second PDSCH may be used to transmit downlink data of the second network device. After receiving the downlink data sent by the first network device, the terminal may feed back an ACK/a NACK to the first network device by using the first PUCCH, and indicate, to the first network device by using the ACK/NACK, whether the terminal correctly receives the downlink data sent by the first network device. Generally, propagation losses (or referred to as path losses) from the terminal to different network devices are different. A propagation loss from the terminal to the network device needs to be first determined, and the transmit power on the uplink channel is determined based on the propagation loss from the terminal to the network device, so that the network device can correctly receive the uplink channel sent by the terminal.

The propagation loss in this application refers to large-scale fading related to a distance. Therefore, the propagation loss from the network device to the terminal is the same as the propagation loss from the terminal to the network device. If the propagation loss from the network device to the terminal is known, the propagation loss from the terminal to the network device is also known. Therefore, the propagation loss, namely, the first propagation loss, from the terminal to the first network device may be determined by determining the propagation loss from the first network device to the terminal.

The first propagation loss is equal to a difference between a receive power of a reference signal that is sent by the first network device and that is received by the terminal and a transmit power of the reference signal that is sent by the first network device and that is received by the terminal. A power of the reference signal sent by the first network device is configured at a higher layer. Therefore, only the power (briefly referred to as a receive power below) of the reference signal that is sent by the first network device and that is received by the terminal needs to be learned of. The receive power may be obtained by measuring a first reference signal sent by the first network device. Therefore, the terminal first needs to determine which reference signal in a plurality of reference signals received by the terminal is sent by the first network device. In other words, the terminal first needs to determine the first reference signal in the reference signal sent by the first network device.

In one embodiment, a downlink reference signal in the embodiments of this application may be one or more of a synchronization signal (for example, a primary synchronization signal (PSS) and/or a secondary synchronization signal (SSS)), a channel state information-reference signal (CSI-RS), and a demodulation reference signal (DMRS). The PSS and/or the SSS may be sent by using an SS block, in other words, the PSS, the SSS, and a physical broadcast channel (PBCH) are simultaneously sent; or the PSS and/or the SSS may be sent without using an SS block, in other words, the PSS and/or the SSS may be separately sent.

In one embodiment, the terminal may determine a first downlink reference signal in the following manners:

Manner 1:

The terminal may receive physical layer signaling (for example, first DCI) and/or higher layer signaling sent by the network device, and determine the first downlink reference signal based on a QCL relationship that is between antenna ports on which a plurality of downlink reference signals are sent and that is indicated by quasi-co-location (QCL) indication information carried in the physical layer signaling and/or higher layer signaling.

In one embodiment, the terminal may determine, based on the QCL indication information, the QCL relationship between the antenna ports on which the plurality of downlink reference signals are sent. Because the terminal can learn, based on the first DCI, of an antenna port on which the first network device sends a DMRS, the terminal may determine, based on the QCL relationship, an antenna port on which the first network device sends a CSI-RS and/or a synchronization signal and that is in the QCL relationship with the antenna port on which the first network device sends the DMRS, in other words, may determine the antenna port on which the first network device sends the CSI-RS and/or the synchronization signal, to determine the CSI-RS and/or the synchronization signal, namely, the first downlink reference signal, sent by the first network device. For example, the QCL indication information may indicate that an antenna port 15 on which the CSI-RS is sent and an antenna port 7 on which the DMRS is sent meet the QCL relationship. Because reference signals that meet the QCL relationship are from a same network device, the terminal may determine that the CSI-RS sent on the antenna port 15 and the DMRS on the antenna port 7 indicated by the first DCI are from the same network device, namely, the first network device. In other words, the terminal may determine the CSI-RS sent by the first network device. Then, the terminal may obtain a path loss from the first network device to the terminal by measuring the CSI-RS sent on the antenna port 15, to determine a path loss corresponding to the first PUCCH, namely, a first path loss.

Manner 2:

The terminal may receive physical layer signaling and/or higher layer signaling sent by the network device, and determine the first downlink reference signal based on first indication information included in the physical layer signaling and/or the higher layer signaling.

In one embodiment, the first indication information may indicate information (for example, denoted as first resource information) about the first downlink reference signal corresponding to the first PUCCH. For example, the first resource information may be information such as a resource index of the first downlink reference signal, information about an antenna port on which the first downlink reference signal is sent, and a pattern of the first downlink reference signal. The terminal may determine, based on the first resource information, a downlink reference signal corresponding to the first PUCCH, namely, the first downlink reference signal. Then, the terminal may obtain a propagation loss from the first network device to the terminal by measuring the first downlink reference signal, to determine a propagation loss corresponding to the first PUCCH, namely, a first propagation loss.

In one embodiment, the first indication information may further directly indicate the first propagation loss corresponding to the first PUCCH.

It should be understood that the physical layer signaling in the embodiments of this application may be the DCI (for example, the first DCI), and the higher layer signaling may be RRC signaling or a MAC CE.

Manner 3:

The terminal may directly determine, based on information about a DMRS antenna port indicated by the first DCI, a DMRS sent by the first network device, to determine a first propagation loss by measuring the DMRS sent by the first network device.

In one embodiment, after determining the first propagation loss, the terminal may determine the transmit power on the first uplink channel according to the foregoing described formula. In this case, the first propagation loss is $PL_c$ in the foregoing described formula.

In one embodiment, the network device may pre-configure a correspondence between a propagation loss and a PUCCH resource by using physical layer signaling (for example, the first DCI) or higher layer signaling. In other words, the network device may indicate, by using the physical layer signaling or the higher layer signaling, which PUCCH resource corresponds to a propagation loss. For example, when configuring a first PUCCH resource by using the higher layer signaling, the network device may configure a propagation loss on the first PUCCH sent on the first PUCCH resource. For another example, when sending the first DCI, the first network device may indicate, in the first DCI, a propagation loss corresponding to a first PUCCH resource, namely, the first propagation loss. The terminal device may determine, based on the correspondence between the propagation loss and the PUCCH resource, the first propagation loss corresponding to the first PUCCH resource. In other words, the terminal may determine, based on the correspondence between the propagation loss and the PUCCH resource, the first propagation loss corresponding to the first PUCCH.

In conclusion, in this application, the first propagation loss may be directly notified to the terminal by the network device (for example, the first network device and/or the second network device), or may be obtained by the terminal by measuring a downlink reference signal. The terminal may determine a transmit power on the first PUCCH with reference to the first propagation loss. A propagation loss from the network device to the terminal is fully considered. Therefore, according to the power control method in this embodiment of this application, a probability that the network device correctly receives an uplink channel can be improved, to improve system performance.

In one embodiment, in this application, the terminal may determine the first propagation loss and a second propagation loss in a plurality of manners. The following describes the manners in detail.

In one embodiment, when determining the transmit power on the uplink channel of each of the at least two network devices based on the at least two transmit power control commands, the terminal may first determine an $i^{th}$ candidate transmit power $P_{1i}$ in at least two candidate transmit powers based on an $i^{th}$ transmit power control command in the at least two transmit power control commands. The at least two transmit power control commands are in a one-to-one correspondence with the at least two candidate transmit powers; a value of i is obtained through traversing in a range of 1 to N, and i is a positive integer; N is a quantity of at least two uplink channels, and N is a positive integer greater than 1; and $P_{1i}>0$. For example, the terminal may use, as the $i^{th}$ candidate transmit power $P_{1i}$, a transmit power directly obtained through calculation based on an adjustment step or an absolute power adjustment value corresponding to the $i^{th}$ transmit power control command.

Then, when $P_{11}+P_{12}+\ldots+P_{1N} \leq P_0$, the terminal determines that a transmit power on an uplink channel of an $i^{th}$ network device in the at least two network devices is $P_{1i}$.

Alternatively, when $P_{11}+P_{12}+\ldots+P_{1N}>P_0$, the terminal determines a transmit power $P_{2i}$ on an $i^{th}$ uplink channel according to any one of the following formulas:

$$a_0*(P_{11}+P_{12}+\ldots+P_{1N}) \leq P_0, \text{ and } P_{2i}=a_0*P_{1i}; \text{ or}$$

$$a_1*P_{11}+a_2*P_{12}+\ldots+a_N*P_{1N} \leq P_0, \text{ and } P_{2i}=a_i*P_{1i},$$
where $P_{2i}>0$, $P_0$ is a maximum transmit power of the terminal, $a_0$ and $a_i$ are scaling factors, $0<a_0<1$, and $a_i \geq 0$.

Further, if the at least two uplink channels completely overlap in time domain, the terminal may determine transmit powers on the at least two uplink channels according to the foregoing embodiment. In one embodiment, if a sum of transmit powers directly obtained through calculation based on the at least two transmit power control commands is less than or equal to the maximum transmit power of the terminal, the terminal may use a transmit power directly obtained through calculation as a transmit power on a corresponding uplink channel. If a sum of transmit powers directly obtained through calculation based on the at least two transmit power control commands is greater than the maximum transmit power of the terminal, the terminal may use, as a transmit power on a corresponding uplink channel, a product of a scaling factor and a transmit power directly obtained through calculation based on a corresponding transmit power control command.

For example, with reference to the foregoing embodiment, when $P_{PUSCH1,c}(i)+P_{PUSCH2,c}(i) \leq P_0$, the terminal may use $P_{PUSCH1,c}(i)$ as the transmit power on the first uplink channel, and use $P_{PUSCH2,c}(i)$ as the transmit power on the second uplink channel. When $P_{PUSCH1,c}(i)+P_{PUSCH2,c}(i)>P_0$, the terminal may use $a_1*P_{PUSCH1,c}(i)$ as the transmit power on the first uplink channel, and use $a_2*P_{PUSCH2,c}(i)$ as the transmit power on the second uplink channel. Herein, $a_1*P_{PUSCH1,c}(i)+a_2*P_{PUSCH2,c}(i) \leq P_0$.

Further, the scaling factor $a_i$ is determined based on a priority of the uplink channel of the $i^{th}$ network device.

For example, a higher channel priority indicates a larger corresponding scaling factor, and a lower channel priority indicates a smaller corresponding scaling factor. For example, if a priority of an uplink channel corresponding to a serving network device of the terminal may be higher than a priority of an uplink channel corresponding to a cooperating network device of the terminal, a scaling factor corresponding to the uplink channel (for example, denoted as a first PUCCH) corresponding to the serving network device of the terminal is greater than a scaling factor corresponding to the uplink channel (for example, denoted as a second PUCCH) corresponding to the cooperating network device of the terminal.

For another example, if a priority of a PUCCH is higher than a priority of a PUSCH, a scaling factor corresponding to the PUCCH may be set to 1.

For example, when two uplink channels, namely, a first uplink channel and a second uplink channel sent by the terminal are respectively a PUCCH and a PUSCH, transmit powers on the PUCCH and the PUSCH may be determined according to the following formula:

$$a_1 P_{PUSCH}+P_{PUSCH} \leq P_0$$

In other words, $a_2=1$, the transmit power on the first uplink channel is $P_{PUCCH}$, and the transmit power on the second uplink channel is $\eta P_{PUSCH}$.

In this embodiment of this application, the scaling factor $a_i$ may be pre-configured, or may be obtained by the terminal from the network device, or may be obtained by the terminal through calculation. A source of the scaling factor $a_i$ is not limited in this embodiment of this application.

In one embodiment, the method may further include the following operation:

S530. The terminal sends a corresponding uplink channel to each of the at least two network devices on the same carrier based on a transmit power on the corresponding uplink channel.

In one embodiment, the terminal sends corresponding UCI or data to a corresponding network device based on the transmit power on the uplink channel that is determined in operation S520. The UCI or the data is carried on the corresponding uplink channel.

For example, the terminal may send UCI or data of the first network device to the first network device based on the transmit power on the first uplink channel that is determined in operation S520, where the UCI or the data is carried on the first uplink channel; and may send UCI or data of the second network device to the second network device based on the transmit power on the second uplink channel that is determined in operation S520, where the UCI or the data is carried on the second uplink channel.

Therefore, according to the power control method in this embodiment of this application, the terminal determines a transmit power on each uplink channel based on a plurality of transmit power control commands, thereby ensuring efficient and proper power allocation and improving overall system performance.

The foregoing describes the power control methods according to the embodiments of this application with reference to FIG. 2 to FIG. 5. The following describes terminals and network devices according to embodiments of this application with reference to FIG. 6 to FIG. 11.

Figure 6:
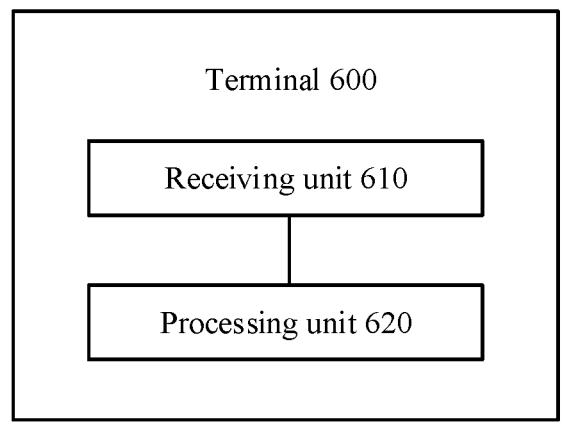
FIG. 6 is a schematic block diagram of a terminal in this application.

FIG. 6 is a schematic block diagram of a terminal 600 according to an embodiment of this application. As shown in FIG. 6, the terminal 600 includes a receiving unit 610 and a processing unit 620.

The receiving unit 610 is configured to receive at least one piece of downlink control information DCI sent by at least one network device, where the at least one piece of DCI includes at least two transmit power control commands.

The processing unit 620 is configured to determine a transmit power on an uplink channel in a same carrier based on the at least two transmit power control commands.

In the embodiments of this application, the terminal can ensure, based on a plurality of received transmit power control commands in a power scaling manner, that a power for uplink transmission is less than a maximum transmit power of the terminal.

It should be understood that each unit in the terminal 600 is configured to perform each action or processing process performed by the terminal in the method. To avoid repetition, detailed descriptions thereof are omitted herein.

Figure 7:
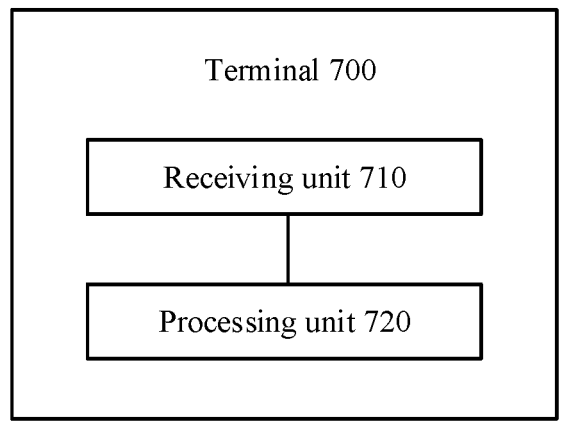
FIG. 7 is a schematic block diagram of another terminal in this application.

FIG. 7 is a schematic block diagram of a terminal 700 according to an embodiment of this application. As shown in FIG. 7, the terminal 700 includes a receiving unit 710 and a processing unit 720.

The receiving unit 710 is configured to receive downlink control information DCI sent by a first network device, where the DCI includes at least two transmit power control commands of the terminal 700.

The processing unit 720 is configured to determine a transmit power on an uplink channel of each of at least two network devices based on the at least two transmit power control commands, where the at least two network devices are in a one-to-one correspondence with the at least two transmit power control commands, and the at least two network devices include the first network device.

It should be understood that each unit in the terminal 700 is configured to perform each action or processing process performed by the terminal in the method 500. To avoid repetition, detailed descriptions thereof are omitted herein.

Figure 8:
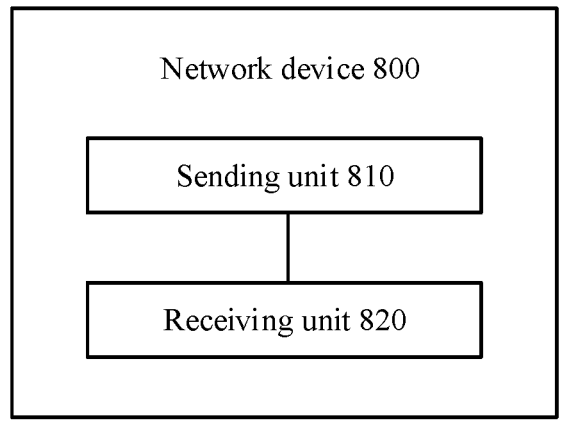
FIG. 8 is a schematic block diagram of a network device in this application.

FIG. 8 is a schematic block diagram of a network device 800 according to an embodiment of this application. As shown in FIG. 8, the network device 800 includes a sending unit 810 and a receiving unit 820.

The sending unit 810 is configured to send downlink control information DCI to a terminal, where the DCI includes at least two transmit power control commands of the terminal, and the at least two transmit power control commands are used by the terminal to determine a transmit power on at least one uplink channel.

The receiving unit 820 is configured to receive a first uplink channel that is in the at least one uplink channel and that is sent by the terminal.

It should be understood that each unit in the network device 800 is configured to perform each action or processing process in the method. To avoid repetition, detailed descriptions thereof are omitted herein.

Figure 9:
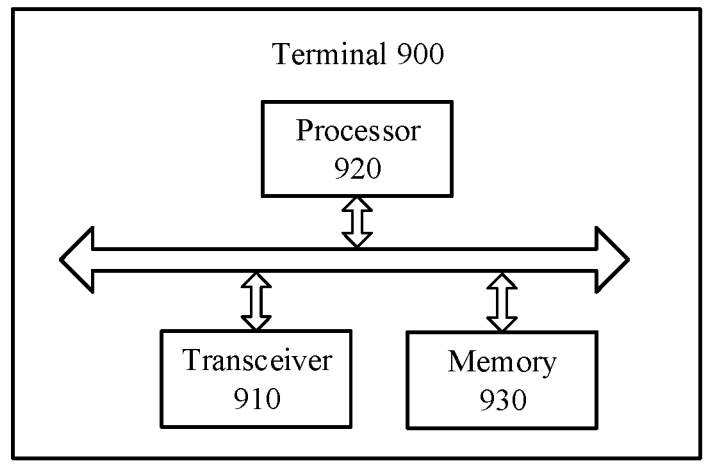
FIG. 9 is a schematic block diagram of a terminal in this application.

FIG. 9 is a schematic structural diagram of a terminal 900 according to an embodiment of this application. As shown in FIG. 9, the terminal 900 includes a transceiver 910, a processor 920, and a memory 930. The transceiver 910, the processor 920, and the memory 930 communicate with each other through an internal connection path to transfer a control signal and/or a data signal.

The transceiver 910 is configured to receive at least one piece of downlink control information DCI sent by at least one network device, where the at least one piece of DCI includes at least two transmit power control commands.

The processor 920 is configured to determine a transmit power on an uplink channel in a same carrier based on the at least two transmit power control commands.

It should be understood that when the processor 920 invokes a computer program from the memory 930 and runs the computer program, the processor 920 may be configured to: perform the methods 200, 300, and 400, and implement functions of execution bodies such as the terminals in the methods.

Figure 10:
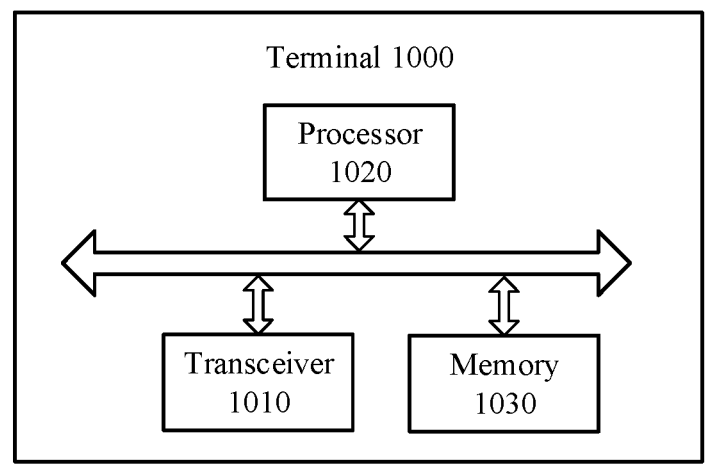
FIG. 10 is a schematic block diagram of another terminal in this application.

FIG. 10 is a schematic structural diagram of a terminal 1000 according to an embodiment of this application. As shown in FIG. 10, the terminal 1000 includes a transceiver 1010, a processor 1020, and a memory 1030. The transceiver 1010, the processor 1020, and the memory 1030 communicate with each other through an internal connection path to transfer a control signal and/or a data signal.

The transceiver 1010 is configured to receive downlink control information DCI sent by a first network device, where the DCI includes at least two transmit power control commands of the terminal 1000.

The processor 1020 is configured to determine a transmit power on an uplink channel of each of at least two network devices based on the at least two transmit power control commands, where the at least two network devices are in a one-to-one correspondence with the at least two transmit power control commands, and the at least two network devices include the first network device.

It should be understood that when the processor 1020 invokes a computer program from the memory 1030 and runs the computer program, the processor 1020 may be configured to: perform the method 500, and implement a function of an execution body such as the terminal in the method.

Figure 11:
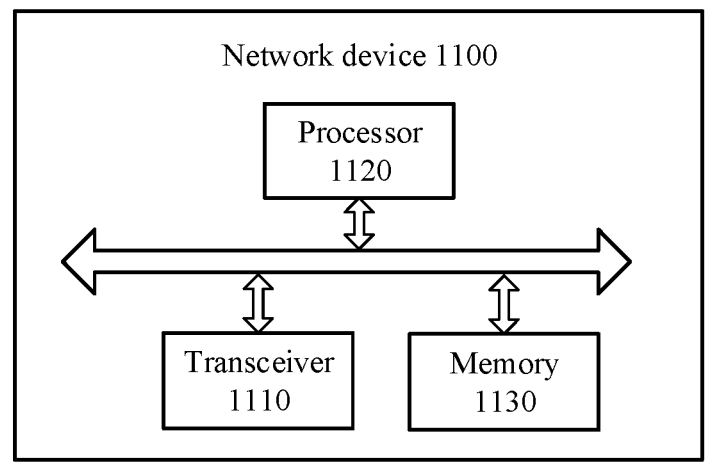
FIG. 11 is a schematic block diagram of a network device in this application.

FIG. 11 is a schematic structural diagram of a network device 1100 according to an embodiment of this application. As shown in FIG. 11, the network device 1100 includes a transceiver 1110, a processor 1120, and a memory 1130. The transceiver 1110, the processor 1120, and the memory 1130 communicate with each other through an internal connection path to transfer a control signal and/or a data signal.

The transceiver 1110 is configured to: send downlink control information DCI to a terminal, where the DCI includes at least two transmit power control commands of the terminal, and the at least two transmit power control commands are used by the terminal to determine a transmit power on at least one uplink channel; and receive a first uplink channel that is in the at least one uplink channel and that is sent by the terminal.

It should be understood that when the processor 1120 invokes a computer program from the memory and runs the computer program, the processor 1120 may be configured to: perform the method embodiment, and implement a function of an execution body such as the network device in the method embodiment.

Figure 12:
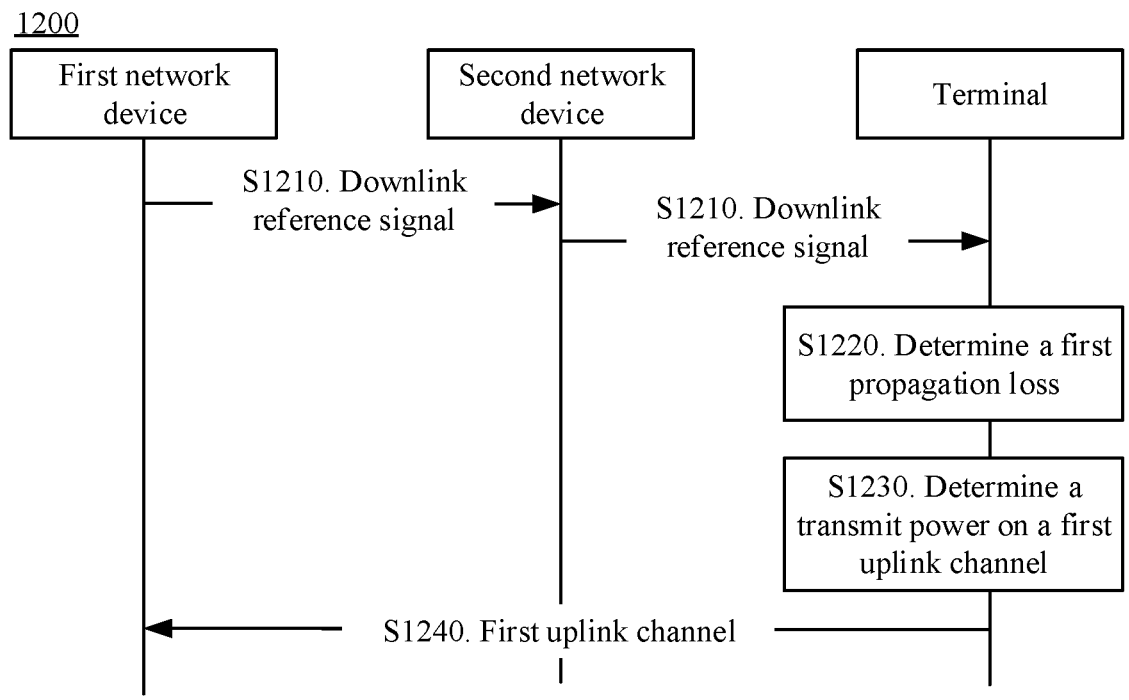
FIG. 12 is a schematic flowchart of another power control method in this application.

FIG. 12 is a schematic diagram of another power control method 1200 in this application. The method 1200 may be applied to a communications system that performs communication by using a radio air interface. The communications system may include at least one network device and at least one terminal. For example, the communications system may be the wireless communications system 100 shown in FIG. 1.

In one embodiment, the network device may be a transmission reception point (TRP) or a base station, or may be another network device configured to send DCI. This is not limited in this application.

In one embodiment, the network device may be a network device in a serving cell, or may be a network device in a cooperating cell. This is not limited in this application.

S1210. The terminal receives a plurality of downlink reference signals sent by a plurality of network devices (for example, a first network device and a second network device).

The plurality of downlink reference signals are all or some downlink reference signals sent by the first network device and the second network device. One network device may send one type of downlink reference signal, or may send a plurality of types of downlink reference signals. This is not limited in this embodiment of this application.

It should be understood that the first network device and the second network device may be two geographically separated network devices, or may be different antenna panels of a same network device (for example, the first network device), or may be different beams of a same network device. This is not limited in this embodiment of this application.

In one embodiment, the downlink reference signal in embodiments of this application may be one or more of a synchronization signal (for example, a PSS and/or an SSS), a CSI-RS, and a DMRS. The PSS and/or the SSS may be sent by using an SS block, in other words, the PSS, the SSS, and a PBCH are simultaneously sent; or the PSS and/or the SSS may be sent without using an SS block, in other words, the PSS and/or the SSS may be separately sent.

For example, the plurality of downlink reference signals include a CSI-RS sent by the first network device and a CSI-RS sent by the second network device. Alternatively, the plurality of downlink reference signals include a CSI-RS and a DMRS that are sent by the first network device, and a CSI-RS and a DMRS that are sent by the second network device. A quantity of downlink reference signals sent by each network device and a type of a downlink reference signal sent by each network device are not limited in this embodiment of this application.

S1220. The terminal determines a first propagation loss on a first uplink channel by measuring a first downlink reference signal in the plurality of downlink reference signals.

The first uplink channel is an uplink channel sent by the terminal to the first network device. In other words, the first uplink channel corresponds to the first network device. The uplink channel may be an uplink control channel PUCCH used to carry ACK/NACK information and/or channel state information corresponding to downlink data, may be an uplink data shared channel PUSCH, may be an uplink access channel PRACH, or may be a channel for sending a sounding signal SRS. For example, the uplink channel is the PUCCH. The terminal may determine, in any one or a combination of the following manners, a first PUCCH based on DCI (for example, denoted as first DCI) sent by the first network device or based on DCI sent by the network device by using a downlink control channel. This part may be decoupled from (independent of) another part in this application for application, or may be combined with another part for application. This is not limited in this application.

Manner 1:

The terminal determines the first uplink channel based on indication information in the first DCI.

In one embodiment, the first DCI may include one piece of indication information, and the indication information may indicate one uplink channel resource. The uplink channel resource indicated by the indication information may be configured by a network device, for example, the first network device by using higher layer signaling (for example, RRC signaling or a MAC CE). In other words, the first DCI may indicate one uplink channel resource in a plurality of uplink channel resources configured by using the higher layer signaling. The uplink channel resource may be carried on an uplink channel. For example, the uplink channel may be the PUCCH. Therefore, the terminal may determine the first PUCCH based on the indication information in the first DCI.

Manner 2:

The terminal may determine one uplink channel resource based on a resource location of the first DCI, for example, a location or a number of a CCE used when DCI is sent. The determined uplink channel resource is a resource for sending the first PUCCH. In one embodiment, for how the terminal determines the uplink channel resource based on the resource location of the DCI, refer to the prior art and the foregoing description. For brevity, details are not described herein again.

Manner 3:

In one embodiment, a correspondence between the first DCI and the PUCCH may be configured by using higher layer signaling (for example, RRC signaling or MAC CE) or predefined. For example, a one-to-one correspondence between the first DCI and the PUCCH may be determined based on a location at which a network device sends DCI, for example, different control resource sets (CORESET), or different candidate PDCCHs, or different search spaces, or different CCEs. For example, a CORESET 1 may be applied to the first DCI, and a CORESET 2 may be applied to second DCI. It may be configured by using configuration information in the higher layer signaling or predefined that DCI in the CORESET 1 corresponds to the first PUCCH and DCI in the CORESET 2 corresponds to a second PUCCH. The terminal determines, based on a predefined relationship (e.g., specified in a protocol, locally pre-configured, or pre-stored) or the configuration information in the higher layer signaling, that an uplink channel that needs to be sent and that corresponds to the DCI received in the first CORESET 1 is the first PUCCH and an uplink channel that needs to be sent and that corresponds to the DCI received in the second CORESET 2 is a second PUCCH.

Manner 4:

In one embodiment, a correspondence between a DMRS group used by a downlink control channel PDCCH for sending DCI and a PUCCH may be predefined (e.g., specified in a protocol, locally pre-configured, or pre-stored), or configured by using higher layer signaling (for example, RRC signaling or MAC signaling). For example, it may be configured by using the higher layer signaling or predefined that the first network device sends the first DCI on the downlink control channel PDCCH by using a DMRS sent on a DMRS antenna port in a DMRS group 1 and the second network device sends second DCI on the downlink control channel PDCCH by using a DMRS sent on a DMRS antenna port in a DMRS group 2. In this way, the terminal may determine a correspondence between the first DCI and the first PUCCH based on the correspondence that is between the DMRS group and the PUCCH and that is configured by using the higher layer signaling or predefined, to determine the first PUCCH.

It should be understood that the DMRS group 1 includes one or more DMRS antenna ports, and a DMRS/DMRSs sent on the one or more DMRS antenna ports is/are used to demodulate the first PDCCH. The DMRS group 2 includes one or more DMRS antenna ports, and a DMRS/DMRSs sent on the one or more DMRS antenna ports is/are used to demodulate a second PDCCH. The DMRS antenna port included in the DMRS group 1 and the DMRS antenna port included in the DMRS group 2 are different from each other or orthogonal to each other.

Manner 5:

In one embodiment, the terminal may determine the first PUCCH based on a QCL relationship between a downlink pilot and an uplink pilot used by the first PUCCH. For a definition of QCL in this embodiment of this application, refer to a definition in LTE. In one embodiment, signals sent from antenna ports that are QCL pass through same large-scale fading. The large-scale fading includes one or more of the following: a delay spread, a Doppler spread, a Doppler frequency shift, an average channel gain, an average delay, and the like. For a definition of QCL in this embodiment of this application, further refer to a definition of QCL in 5G In a new radio NR system, a definition of QCL is similar to that in an LTE system, but spatial information is added. For example, signals sent from antenna ports that are QCL pass through same large-scale fading. The large-scale fading includes one or more of the following parameters: a delay spread, a Doppler spread, a Doppler frequency shift, an average channel gain, an average delay, a spatial parameter, and the like. The spatial parameter may be one or more of an angle of arrival (AoA), a dominant angle of arrival (Dominant AoA), an average angle of arrival (Average AoA), an angle of departure (AoD), a channel-related matrix, a power extension spectrum, a power angle extension spectrum of an angle of arrival, an average angle of departure (Average AoD), a power angle extension spectrum of an angle of departure, transmit channel correlation, receive channel correlation, transmit beamforming, receive beamforming, spatial channel correlation, a spatial filter, a spatial filtering parameter, a spatial receiving parameter, or the like.

The QCL relationship includes one or more of the following: channel state information-reference signals (CSI-RS), DMRSs, phase tracking reference signals (PTRS) (also referred to as phase compensation reference signals (PCRS), phase noise reference signals, synchronization signal blocks (SS block) (including one or more of a synchronization signal and a broadcast channel, where the synchronization signal includes a primary synchronization signal PSS and/or a secondary synchronization signal SSS), uplink sounding signals SRS (sounding reference signal, SRS), uplink DMRSs, uplink random access channels, or the like that meet the QCL relationship.

For example, a correspondence between the first DCI and the first PUCCH may be determined based on a QCL relationship between DMRSs of downlink data scheduled by using the first DCI, or DMRSs on a downlink control channel used by the first DCI, or downlink CSI-RSs, or downlink SS blocks (including a downlink synchronization signal PSS and/or a downlink synchronization signal SSS and/or a PBCH, or DMRSs used by a downlink phase noise pilot PTRS and the first PUCCH, or SRSs, or PRACHs that is configured by using higher layer signaling (for example, RRC signaling or MAC signaling) or predefined, to determine the first PUCCH.

In this application, a reference signal may also be referred to as a pilot.

In one embodiment, the network device may determine, by using the DCI sent on the downlink control channel, the relationship between the first DCI and the first PUCCH in the foregoing manners 1 to 5, in other words, may determine a relationship between a first downlink control channel carrying the DCI and the first uplink channel. This is not limited in this application.

In addition, in this embodiment of this application, the first uplink channel may also be irrelevant to sent downlink control information DCI. For example, the first uplink channel PUCCH may be used to determine PUCCH resource information based on a periodic CSI feedback configured by the network device by using the higher layer signaling and/or first CSI-RS information configured by the network device, and the terminal may periodically feed back the PUCCH. A propagation loss used by the terminal to send first PUCCH may be obtained by measuring the first CSI-RS reference signal.

The PUCCH is used as an example in the foregoing in this application, but the uplink channel in this application is not limited to the PUCCH. For example, the uplink channel may further be an uplink data shared channel PUSCH, an uplink access channel PRACH, a channel for sending a sounding signal SRS, or the like. In one embodiment, the uplink channel resource may include at least one of the following: a time domain resource (for example, a start OFDM symbol and an end OFDM symbol that are occupied by the PUCCH in a time unit, or a quantity of OFDM symbols occupied by a start symbol occupied by the PUCCH in a time unit), a frequency domain resource, a used numerology such as a subcarrier spacing, and a used sequence.

The time unit may be a subframe, a slot, a mini-slot, a time unit defined in an NR system, or a time unit defined in a future system. This is not limited in this embodiment of this application.

S1230. The terminal determines a transmit power on the first uplink channel based on the first propagation loss.

Generally, propagation losses (or referred to as path losses) from the terminal to different network devices are different. A propagation loss from the terminal to the network device needs to be first determined, and the transmit power on the uplink channel is determined based on the propagation loss from the terminal to the network device, so that the network device can correctly receive the uplink channel sent by the terminal.

The propagation loss in this application refers to large-scale fading related to a distance. Therefore, the propagation loss from the network device to the terminal is the same as the propagation loss from the terminal to the network device. If the propagation loss from the network device to the terminal is known, the propagation loss from the terminal to the network device is also known. Therefore, the propagation loss, namely, the first propagation loss, from the terminal to the first network device may be determined by determining the propagation loss from the first network device to the terminal.

The first propagation loss is equal to a difference between a receive power of a reference signal that is sent by the first network device and that is received by the terminal and a transmit power of the reference signal that is sent by the first network device and that is received by the terminal. A power of the reference signal sent by the first network device is configured at a higher layer. Therefore, only the power (briefly referred to as a receive power below) of the reference signal that is sent by the first network device and that is received by the terminal needs to be learned of. The receive power may be obtained by measuring a first reference signal sent by the first network device. Therefore, the terminal first needs to determine which reference signal in a plurality of reference signals received by the terminal is sent by the first network device. In other words, the terminal first needs to determine the first reference signal in the reference signal sent by the first network device.

In one embodiment, the terminal may determine a first downlink reference signal in the following manners:

Manner 1:

The terminal may receive physical layer signaling (for example, first DCI) and/or higher layer signaling sent by the network device, and determine the first downlink reference signal based on a QCL relationship that is between antenna ports on which the plurality of downlink reference signals are sent and that is indicated by quasi-co-location QCL indication information carried in the physical layer signaling and/or higher layer signaling.

In one embodiment, the terminal may determine, based on the QCL indication information, the QCL relationship between the antenna ports on which the plurality of downlink reference signals are sent. Because the terminal can learn, based on the first DCI, of an antenna port on which the first network device sends a DMRS, the terminal may determine, based on the QCL relationship, an antenna port on which the first network device sends a CSI-RS and/or a synchronization signal and that is in the QCL relationship with the antenna port on which the first network device sends the DMRS, in other words, may determine the antenna port on which the first network device sends the CSI-RS and/or the synchronization signal, to determine the CSI-RS and/or the synchronization signal, namely, the first downlink reference signal, sent by the first network device. For example, the QCL indication information may indicate that an antenna port 15 on which the CSI-RS is sent and an antenna port 7 on which the DMRS is sent meet the QCL relationship. Because reference signals that meet the QCL relationship are from a same network device, the terminal may determine that the CSI-RS sent on the antenna port 15 and the DMRS on the antenna port 7 indicated by the first DCI are from the same network device, namely, the first network device. In other words, the terminal may determine the CSI-RS sent by the first network device. Then, the terminal may obtain a path loss from the first network device to the terminal by measuring the CSI-RS sent on the antenna port 15, to determine a path loss corresponding to the first PUCCH, namely, a first path loss.

Manner 2:

The terminal may receive physical layer signaling and/or higher layer signaling sent by the network device, and determine the first downlink reference signal based on first indication information included in the physical layer signaling and/or the higher layer signaling.

In one embodiment, the first indication information may indicate information (for example, denoted as first resource information) about the first downlink reference signal corresponding to the first PUCCH. For example, the first resource information may be information such as a resource index of the first downlink reference signal, information about an antenna port on which the first downlink reference signal is sent, and a pattern of the first downlink reference signal. The terminal may determine, based on the first resource information, a downlink reference signal corresponding to the first PUCCH, namely, the first downlink reference signal. Then, the terminal may obtain a propagation loss from the first network device to the terminal by measuring the first downlink reference signal, to determine a propagation loss corresponding to the first PUCCH, namely, a first propagation loss.

In one embodiment, the first indication information may further directly indicate the first propagation loss corresponding to the first PUCCH.

It should be understood that the physical layer signaling in this embodiment of this application may be the DCI (for example, the first DCI), and the higher layer signaling may be RRC signaling or a MAC CE.

Manner 3:

The terminal may directly determine, based on information about a DMRS antenna port indicated by the first DCI, a DMRS sent by the first network device, to determine a first propagation loss by measuring the DMRS sent by the first network device.

In one embodiment, after determining the first propagation loss, the terminal may determine the transmit power on the first uplink channel according to the foregoing described formula. In this case, the first propagation loss is $PL_c$ in the foregoing described formula.

In one embodiment, the network device may pre-configure a correspondence between a propagation loss and a PUCCH resource by using physical layer signaling (for example, the first DCI) or higher layer signaling. In other words, the network device may indicate, by using the physical layer signaling or the higher layer signaling, which PUCCH resource corresponds to a propagation loss. For example, when configuring a first PUCCH resource by using the higher layer signaling, the network device may configure a propagation loss on the first PUCCH sent on the first PUCCH resource. For another example, when sending the first DCI, the first network device may indicate, in the first DCI, a propagation loss corresponding to a first PUCCH resource, namely, the first propagation loss. The terminal device may determine, based on the correspondence between the propagation loss and the PUCCH resource, the first propagation loss corresponding to the first PUCCH resource. In other words, the terminal may determine, based on the correspondence between the propagation loss and the PUCCH resource, the first propagation loss corresponding to the first PUCCH.

In one embodiment, the method may further include:

S1240. The terminal sends the first uplink channel based on the transmit power on the first uplink channel.

In conclusion, in this application, the first propagation loss may be directly notified to the terminal by the network device (for example, the first network device and/or the second network device), or may be obtained by the terminal by measuring a downlink reference signal. The terminal may determine a transmit power on the first PUCCH with reference to the first propagation loss. A propagation loss from the network device to the terminal is fully considered. Therefore, according to the power control method in this embodiment of this application, a probability that the network device correctly receives an uplink channel can be improved, to improve system performance.

Figure 13:
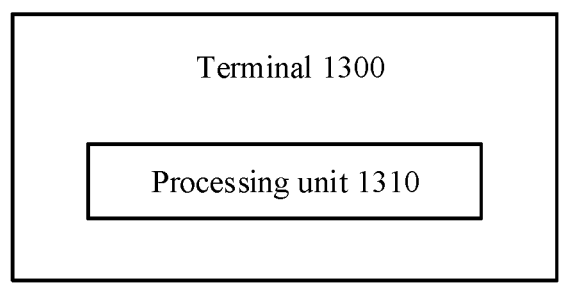
FIG. 13 is a schematic block diagram of another terminal in this application.

FIG. 13 is a schematic block diagram of a terminal 1300 according to an embodiment of this application. As shown in FIG. 13, the terminal 1300 includes a processing unit 1310.

The processing unit 1310 determines a first propagation loss on a first uplink channel, where the first propagation loss is obtained by measuring a first downlink reference signal in a plurality of downlink reference signals.

The processing unit 1310 is further configured to determine a transmit power on the first uplink channel based on the first propagation loss.

It should be understood that each unit in the terminal 1300 is configured to perform each action or processing process performed by the terminal in the method 1200. To avoid repetition, detailed descriptions thereof are omitted herein.

Figure 14:
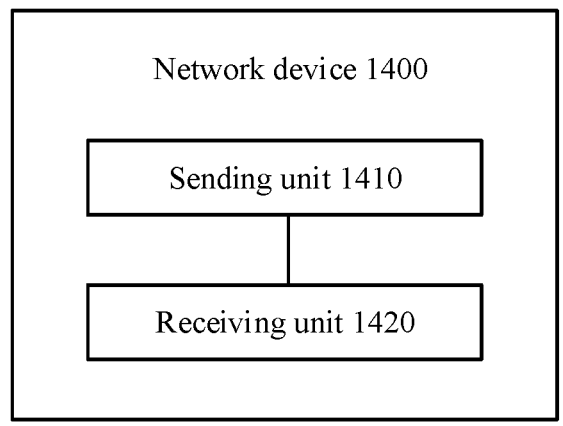
FIG. 14 is a schematic block diagram of a network device in this application.

FIG. 14 is a schematic block diagram of a network device 1400 according to an embodiment of this application. As shown in FIG. 14, the network device 1400 includes a sending unit 1410 and a receiving unit 1420.

The sending unit 1410 is configured to send a first downlink reference signal to a terminal, where the first downlink reference signal is used by the terminal to determine a first propagation loss.

The receiving unit 1420 is configured to receive a first uplink channel sent by the terminal, where a transmit power on the first uplink channel is determined by the terminal based on the first propagation loss.

It should be understood that each unit in the network device 1400 is configured to perform each action or processing process performed by the network device in the method 1200. To avoid repetition, detailed descriptions thereof are omitted herein.

Figure 15:
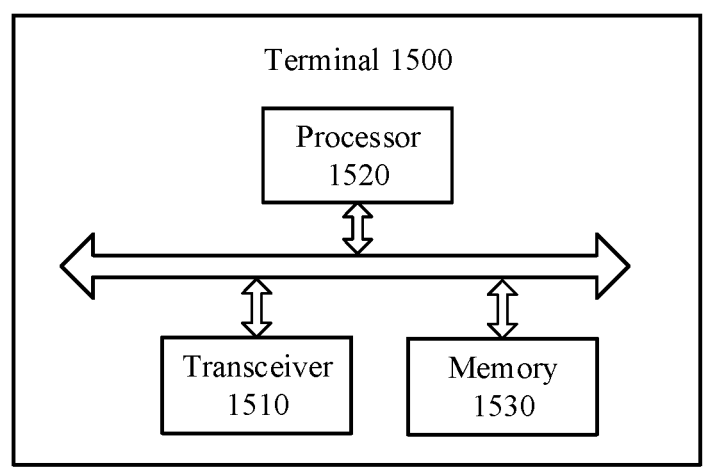
FIG. 15 is a schematic block diagram of another terminal in this application.

FIG. 15 is a schematic structural diagram of a terminal 1500 according to an embodiment of this application. As shown in FIG. 15, the terminal 1500 includes a transceiver 1510, a processor 1520, and a memory 1530. The transceiver 1510, the processor 1520, and the memory 1530 communicate with each other through an internal connection path to transfer a control signal and/or a data signal.

The processor 1520 determines a first propagation loss on a first uplink channel, where the first propagation loss is obtained by measuring a first downlink reference signal in a plurality of downlink reference signals.

The processor 1520 is further configured to determine a transmit power on the first uplink channel based on the first propagation loss.

It should be understood that when the processor 1520 invokes a computer program from the memory and runs the computer program, the processor 1520 may be configured to: perform the method 1200, and implement a function of an execution body such as the terminal in the method.

Figure 16:
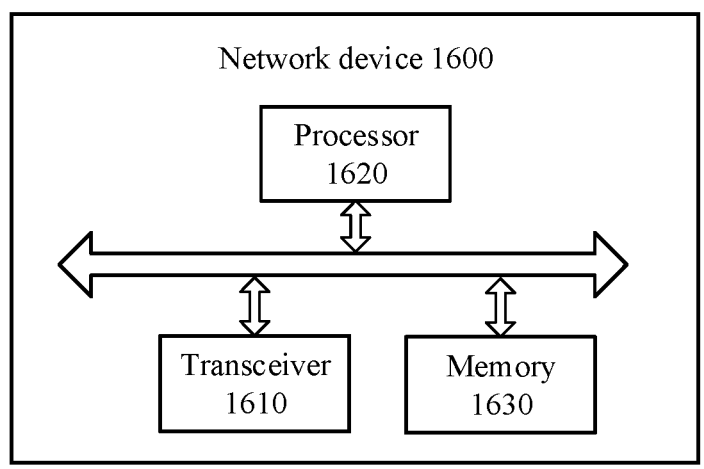
FIG. 16 is a schematic block diagram of a network device in this application.

FIG. 16 is a schematic structural diagram of a network device 1600 according to an embodiment of this application. As shown in FIG. 16, the network device 1600 includes a transceiver 1610, a processor 1620, and a memory 1630. The transceiver 1610, the processor 1620, and the memory 1630 communicate with each other through an internal connection path to transfer a control signal and/or a data signal.

The transceiver 1610 is configured to: send a first downlink reference signal to a terminal, where the first downlink reference signal is used by the terminal to determine a first propagation loss; and receive a first uplink channel sent by the terminal, where a transmit power on the first uplink channel is determined by the terminal based on the first propagation loss.

It should be understood that when the processor 1620 invokes a computer program from the memory and runs the computer program, the processor 1620 may be configured to: perform the method 1200, and implement a function of an execution body such as the network device in the method.

When an integrated unit is used, an embodiment further provides an apparatus. The apparatus may exist in a product form of a chip, and the apparatus may include a processor and a memory.

The memory is configured to: be coupled to the processor, and store program instructions and data of the apparatus. The processor is configured to execute the program instructions stored in the memory, so that the apparatus performs a function corresponding to an operation performed by the terminal or the network device in any one of the foregoing method embodiments.

This embodiment of this application may be applied to the processor, or may be implemented by the processor. The processor may be an integrated circuit chip and have a signal processing capability. In an implementation process, the operations in the foregoing method embodiments may be completed by using an integrated logic circuit of hardware in the processor or by using an instruction in a form of software. The processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, the operations, and logical block diagrams that are disclosed in the embodiments of this application. The general purpose processor may be a microprocessor, or the processor may be any conventional processor or the like. The operations in the methods disclosed with reference to the embodiments of this application may be directly performed and completed by a hardware decoding processor, or may be performed and completed by using a combination of hardware and software units in a decoding processor. The software unit may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the operations in the foregoing methods in combination with hardware of the processor.

It should be further understood that the memory in this embodiment of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and serves as an external cache. In an example instead of limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the system and the method that are described in this specification is intended to include but is not limited to these memories and any other proper type of memory.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in the embodiments of this application.

A person of ordinary skill in the art may be aware that units and algorithm operations in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps or operations in the methods in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal comprising:
a transceiver configured to receive at least one piece of downlink control information (DCI) from at least one network device, wherein the at least one piece of DCI comprises at least two transmit power control commands; and
a processor configured to:
determine a transmit power on an uplink channel in a same carrier based on the at least two transmit power control commands, wherein the transmit power on the uplink channel is determined based on an adjustment step or an absolute power adjustment value indicated by each transmit power control command and a propagation loss corresponding to the uplink channel of the at least one network device including: separately determining at least two candidate transmit powers based on the at least two transmit power control commands, wherein the at least two candidate transmit powers are in a one-to-one correspondence with the at least two transmit power control commands; and determining the transmit power on the uplink channel based on the at least two candidate transmit powers.

2. The terminal according to claim 1, wherein the transceiver is configured to:
receive DCI from a first network device, wherein the DCI from the first network device comprises the at least two transmit power control commands of the terminal, and the first network device incudes any one of the at least one network devices.

3. The terminal according to claim 2, wherein the at least two transmit power control commands occupy n bits, n being a positive integer greater than 2, and a correspondence between the n bits and the at least two transmit power control commands configured by using higher layer signaling or being predefined.

4. The terminal according to claim 1, wherein the processor is configured to:
determine, as the transmit power on the uplink channel, a maximum transmit power or a minimum transmit power in the at least two candidate transmit powers, or an average value of the at least two candidate transmit powers.

5. The terminal according to claim 1, wherein the processor is configured to:
determine the transmit power on the uplink channel based on a first transmit power control command in the at least two transmit power control commands.

6. A terminal comprising:
a transceiver configured to receive downlink control information (DCI) from a first network device, wherein the DCI comprises at least two transmit power control commands of the terminal; and
a processor configured to determine a transmit power on an uplink channel of each of at least two network devices based on the at least two transmit power control commands, wherein the at least two network devices are in a one-to-one correspondence with the at least two transmit power control commands, and the at least two network devices include the first network device, wherein the transmit power on the uplink channel of each network device is determined based on an adjustment step or an absolute power adjustment value indicated by each transmit power control command, and wherein the transmit power on the uplink channel of each network device is determined based on the adjustment step indicated by each transmit power control command and a propagation loss corresponding to the uplink channel of each network device or based on the absolute power adjustment value indicated by each transmit power control command and a propagation loss corresponding to the uplink channel of each network device.

7. The terminal according to claim 6, wherein the at least two transmit power control commands occupy n bits, n being a positive integer greater than 2, and a correspondence between the n bits and the at least two transmit power control commands configured by using higher layer signaling or being predefined.

8. The terminal according to claim 7, wherein the processor is configured to:
determine an $i^{th}$ candidate transmit power $P_{1i}$ in at least two candidate transmit powers based on an $i^{th}$ transmit power control command in the at least two transmit power control commands, wherein the at least two transmit power control commands are in a one-to-one correspondence with the at least two candidate transmit powers; a value of i is obtained through traversing in a range of 1 to N, and i is a positive integer; N is a quantity of the at least two uplink channels, and N is a positive integer greater than 1; and $P_{1i}>0$; and
when $P_{11}+P_{12}+ \ldots +P_{1N} \geq P_0$, determine that a transmit power on an uplink channel of an $i^{th}$ network device in the at least two network devices is $P_{1i}$; or
when $P_{11}+P_{12}+ \ldots +P_{1N}>P_0$, determine a transmit power $P_{2i}$ on an $i^{th}$ uplink channel according to one of the following formulas:
$a_0*(P_{11}+P_{12}+ \ldots +P_{1N}) \leq P_0$, and $P_{2i}=a_0*P_{1i}$; or
$a_1*P_{11}+a_2*P_{12}+ \ldots +a_N*P_{1N} \leq P_0$, and $P_{2i}=a_i*P_{1i}$, wherein $P_{2i}>0$, $P_0$ is a maximum transmit power of the terminal, and $a_0$ and $a_i$ are scaling factors, $0>a_0>1$, and $a_i \geq 0$.

9. The terminal according to claim 8, wherein the scaling factor $a_i$ is determined based on a priority of the uplink channel of the $i^{th}$ network device.

10. The terminal according to claim 6, wherein the propagation loss corresponding to the uplink channel of each network device is indicated by using indication information in the DCI or higher layer signaling.

11. A method for power control comprising:
receiving, by a terminal, at least one piece of downlink control information (DCI) from at least one network device, wherein the at least one piece of DCI comprises at least two transmit power control commands; and
determining, by the terminal, a transmit power on an uplink channel in a same carrier based on the at least two transmit power control commands, wherein the transmit power on the uplink channel is determined based on an adjustment step or an absolute power adjustment value indicated by each transmit power control command and a propagation loss corresponding to the uplink channel of the at least one network device including: separately determining at least two candidate transmit powers based on the at least two transmit power control commands, wherein the at least two candidate transmit powers are in a one-to-one correspondence with the at least two transmit power control commands; and determining the transmit power on the uplink channel based on the at least two candidate transmit powers.

12. The method according to claim 11, wherein the receiving at least one piece of DCI from at least one network device comprises:
receiving DCI from a first network device, wherein the DCI from the first network device comprises the at least two transmit power control commands of the terminal, and the first network device includes any one of the at least one network device.

13. The method according to claim 12, wherein the at least two transmit power control commands occupy n bits, n being a positive integer greater than 2, and a correspondence between the n bits and the at least two transmit power control commands configured by using higher layer signaling or being predefined.

14. The method according to claim 11, wherein the determining the transmit power on the uplink channel based on the at least two candidate transmit powers comprises:
determining, as the transmit power on the uplink channel, a maximum transmit power or a minimum transmit power in the at least two candidate transmit powers, or an average value of the at least two candidate transmit powers.

* * * * *

UNITED STATES PATENT AND TRADEMARK OFFICE
CERTIFICATE OF CORRECTION

PATENT NO. : 11,134,447 B2
APPLICATION NO. : 16/579568
DATED : September 28, 2021
INVENTOR(S) : Shengyue Dou et al.

It is certified that error appears in the above-identified patent and that said Letters Patent is hereby corrected as shown below:

In the Claims

In Claim 8, Column 51, Line 37, "$0>a_0>1$" should be --$0<a_0<1$--.

Signed and Sealed this
Sixth Day of December, 2022

Katherine Kelly Vidal
*Director of the United States Patent and Trademark Office*